US010339338B2

(12) United States Patent
Haila et al.

(10) Patent No.: US 10,339,338 B2
(45) Date of Patent: Jul. 2, 2019

(54) SYSTEM AND METHODS FOR PROVIDING QUERY-BASED PERMISSIONS TO DATA

(71) Applicant: WORKIVA INC., Ames, IA (US)

(72) Inventors: David Andrew Haila, Ames, IA (US); Graham Cummins, Bozeman, MT (US); Robert Ray Lamb, Bozeman, MT (US); Jeroen Sebastian Cranendonk, Bozeman, MT (US)

(73) Assignee: Workiva Inc., Ames, IA (US)

( * ) Notice: Subject to any disclaimer, the term of this patent is extended or adjusted under 35 U.S.C. 154(b) by 0 days.

(21) Appl. No.: 16/046,373

(22) Filed: Jul. 26, 2018

(65) Prior Publication Data

US 2018/0336364 A1    Nov. 22, 2018

Related U.S. Application Data

(63) Continuation-in-part of application No. 15/613,911, filed on Jun. 5, 2017, now Pat. No. 10,095,881, which is a continuation of application No. 15/159,340, filed on May 19, 2016, now Pat. No. 9,692,764.

(60) Provisional application No. 62/296,862, filed on Feb. 18, 2016.

(51) Int. Cl.
*G06F 16/245* (2019.01)
*G06F 21/62* (2013.01)

(52) U.S. Cl.
CPC ........ *G06F 21/6227* (2013.01); *G06F 16/245* (2019.01); *G06F 2221/2113* (2013.01); *G06F 2221/2137* (2013.01)

(58) Field of Classification Search
CPC ......... G06F 17/30424; G06F 17/30436; G06F 17/30448; G06F 21/6227
See application file for complete search history.

(56) References Cited

U.S. PATENT DOCUMENTS

| 5,862,325 | A  | 1/1999  | Reed et al.  |
|-----------|----|---------|--------------|
| 6,038,563 | A  | 3/2000  | Bapat et al. |
| 7,039,871 | B2 | 5/2006  | Cronk        |
| 7,076,736 | B2 | 7/2006  | Hugh         |
| 7,181,017 | B1 | 2/2007  | Nagel et al. |
| 8,495,663 | B2 | 7/2013  | Tien et al.  |
| 8,615,528 | B2 | 12/2013 | Shah         |

(Continued)

OTHER PUBLICATIONS

Adaikkalavan et al., "Secure Shared Continuous Query Processing," ACM SAC'11, 2011, pp. 1000-1005.

(Continued)

*Primary Examiner* — Scott A. Waldron
(74) *Attorney, Agent, or Firm* — Drinker Biddle & Reath LLP

(57) ABSTRACT

A method includes generating, in a graph database, an access role vertex that defines an access role of a user, where the access role vertex is connected to a user vertex representing the user; generating a query vertex including a traversal clause that represents a query of the graph database; generating a permission edge between the access role vertex and the query vertex, where the permission edge defines the access role's permission to access the results of the query; receiving a request to execute the query on behalf of the user; in response to the request, traversing the graph database according to the traversal clause to locate a set of vertices; and generating a set of results based on the set of vertices.

23 Claims, 21 Drawing Sheets

(56) References Cited

U.S. PATENT DOCUMENTS

| | | |
|---|---|---|
| 8,798,519 B2 | 8/2014 | Dozier et al. |
| 9,348,947 B2 | 5/2016 | Stetson et al. |
| 2003/0227487 A1 | 12/2003 | Hugh |
| 2013/0117060 A1 | 5/2013 | Henriksen et al. |
| 2014/0129511 A1 | 5/2014 | Bramel et al. |
| 2014/0373176 A1 | 12/2014 | Arning et al. |
| 2016/0140205 A1 | 5/2016 | Hsu et al. |
| 2017/0091470 A1* | 3/2017 | Infante-Lopez .... G06F 21/6218 |
| 2018/0247073 A1* | 8/2018 | Kreutzer ............ G06F 21/6227 |

OTHER PUBLICATIONS

Luo et al., "LAYER: A cost-efficient mechanism to support multi-tenant database as a service in cloud," The Journal of Systems and Software, Dec. 2, 2014, vol. 101, pp. 86-96.

Microsoft Corporation, "Microsoft Project Server 2010 Administrator's Guide," retrieved from internet at <http://go.microsoft.com/fwlink/p/?LinkId=212382>, 2011, 302 pages.

* cited by examiner

FIG. 10A

| Location | Process | Control ID | Control Name | Description |
|---|---|---|---|---|
| Iowa | Accounts Payable | AR.AP.1 | Two/Three Way Match | At vero eos et accusamus et iusto odio dignissimos ducimus qui blanditiis praesentium |
| Iowa | Accounts Payable | AR.AP.2 | Vendor Maintenance | Nulla facilisi. In elementum malesuada egestas. Vestibulum ante ipsum primis in faucibus. |
| Colorado | Accounts Payable | AR.AP.3 | Invoice Approval | Morbi a commodo dui. Duis dictum, quam at luctus consectetur, ex enim viverra. |
| Colorado | Accounts Receivable | AR.AR.1 | Review of Allowance for Doubtful Accounts | Praesent quam turpis, pretium at condimentum ut, finibus ut augue. Sed a |
| Montana | Accounts Receivable | AR.AR.2 | Account Reconciliation | Ut quis mi ac leo tempor aliquam vitae vel purus. Suspendisse aliquet. |
| Colorado | Accounts Receivable | AR.AR.3 | Accounting Posting Controls | Vestibulum eu ante eu nibh consequat sagittis. Morbi risus dui |
| Montana | Computer Operations | AR.CO.11 | Authorized Access to the Data Center | Suspendisse tempor tellus metus, a imperdiet lorem volutpat quis... |
| Arizona | Computer Operations | AR.CO.15 | Access to Job Scheduler | Phasellus suscipit nulla dui, a consectetur elit maximus in. Suspendisse |
| Arizona | Computer Operations | AR.CO.16 | Approval of Changes to Job Schedule | Nunc feugiat pretium lectus, rhoncus posuere. |

Define Rule

Rule Name: Iowa AP Controls

Rule Description
Controls related to Iowa management

Editable Columns:
- Location
- Process
- Control ID

Add Editable Columns

Filters

Column Filter: Location
Where Location is equal to Iowa or Colorado or Montana or Arizona

[ Cancel ] [ Save ]

1050

ACCESS ROLES

Document Owners
Document Editors

EDITING RULES

Edit Rule 1
Edit Rule 2

COLLABORATOR

Cynthia Noon
Roger Ewing
Leonel Ahn
Dorian Ransom
Linda Stem

EDITING RULES

Edit Rule 2
Edit Rule 2
Edit Rule 2
Edit Rule 1
Edit Rule 2

SYSTEM AND METHODS FOR PROVIDING QUERY-BASED PERMISSIONS TO DATA

CROSS-REFERENCE TO RELATED APPLICATION

This application is a continuation-in-part of U.S. patent application Ser. No. 15/613,911, filed on Jun. 5, 2017, which is a continuation of U.S. patent application Ser. No. 15/159,340, filed on May 19, 2016 (now U.S. Pat. No. 9,692,764), which claims the priority benefit of U.S. Provisional Patent Application No. 62/296,862, entitled "SYSTEM AND METHODS FOR PROVIDING VIEW-BASED PERMISSIONS TO DATA," filed on Feb. 18, 2016. The disclosures of these applications are incorporated herein by reference in their entirety

TECHNICAL FIELD

Embodiments disclosed herein generally relate to a system and method for providing various levels of permissions to data stored in a database, and more particularly, to a system and method for providing view-based or query-based permissions to the data.

BACKGROUND

In a typical database management system, a user's permission to access data is typically granted by a database administrator at the level of data structures (e.g., specific tables, fields, classes or data types). Specific instances of data in those structures typically inherit the permission of their respective structures. Due to this approach, permission to access data is granted at the coarse grain of the data structures (e.g., access control is granted to all data of a particular data type), without regard to the specific instances of data stored in the structures, thus forcing the access control provision to be an all-or-nothing approach. Further problems arise for those creating reports that mix data from a variety of structures. To ensure that a user who executes a report sees what the report creator intends for the user to see, the report creator must be aware of the different data structures included in the report and is forced to provide the user permission to access to the data structures one at a time. When a report is created for multiple users, the report creator must grant permission to each user for each data structure. Thus, the burden on the report creator to provide permission to access the data in the report greatly increases with the increase in the number of users.

DRAWINGS

While the appended claims set forth the features of the present techniques with particularity, these techniques may be best understood from the following detailed description taken in conjunction with the accompanying drawings of which:

FIG. 10A illustrates a user interface that may be used to establish and configure edit rules according to an embodiment.

DETAILED DESCRIPTION

Various embodiments of the disclosure provide a system and methods where permission to access data is provided via database queries. More specifically, when a query creator grants a user or a group of users permission to access and/or execute a query, the system and methods disclosed herein automatically provide the user or the group of users the appropriate permission to access the resultant data set of the query. Furthermore, in an embodiment, the system and methods may generate a data view or data subset specific to a user, where the user-specific data view or the user-specific data subset includes only data from the database that is accessible to the user. Further, the effort demanded of the query creator to provide users permission to access data is relatively constant regardless of the number of data structures or data elements returned by the queries.

Figure 1:
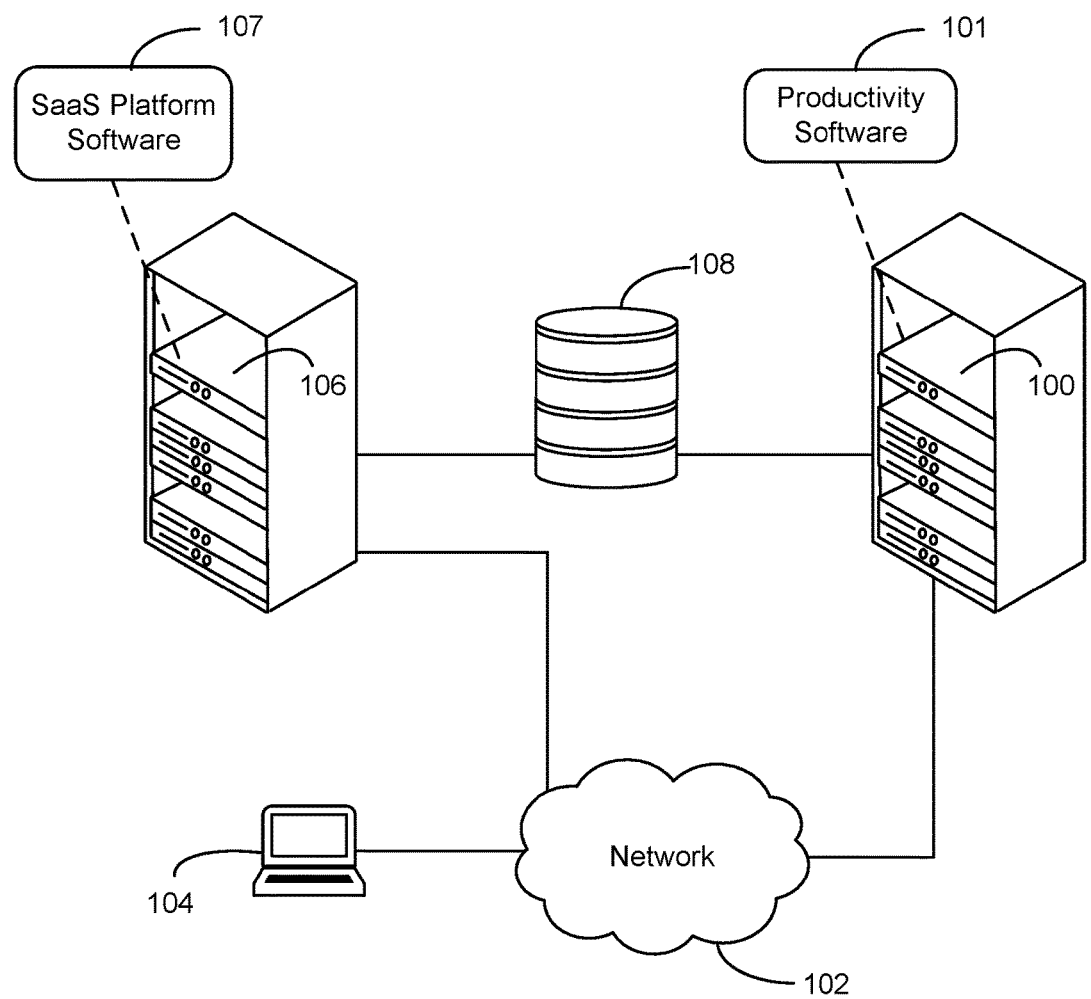
FIG. 1 is a block diagram illustrating an example networking environment in which various embodiments of the disclosure may be employed.

Various embodiments of the disclosure are implemented in a computer networking environment. Turning to FIG. 1, an example of such an environment is shown. A first computing device 100 (e.g., a hardware server or a cluster of hardware servers) is communicatively linked to a network 102. Possible implementations of the network 102 include a local-area network, a wide-area network, a private network, a public network (e.g., the Internet), or any combination of these. The network 102 may include both wired and wireless components. Also communicatively linked to the network 102 are a second computing device 104 (e.g., a client device) and a third computing device 106 (e.g., a hardware server or a cluster of hardware servers). It is to be understood that the various embodiments may be carried out on the first computing device 100, the second computing device 104, or other computing devices not depicted, with the second computing device 104 accessing the first computing device 100 via a thin, web-based client. In an embodiment, the first computing device 100 executes productivity software 101 (e.g., a document editing application, a spreadsheet application, etc.) and the third computing device 106 executes software as a service ("SaaS") platform software 107. The first computing device 100 and the third computing device 106 are communicatively linked to a media storage device 108 (e.g., a memory or a redundant array of independent disks). Although FIG. 1 depicts the media storage device 108 as a single device, in fact, the media storage device 108 may represent a cloud storage service including multiple storage devices.

In another embodiment, the productivity software 101 and the SaaS platform software 107 are executed on the same computing device (e.g., the first computing device 100 or the third computing device 106 ). For example, the productivity software 101 resides on one partition of the first computing device 100 while the SaaS platform software 107 resides on another partition of the first computing device 100. In other embodiments, portions of the productivity software 101 may be executed on both the first computing device 100 and the third computing device 106, and/or portions of the SaaS platform software 107 may be executed on both the first computing device 100 and the third computing device 106. With such network configurations, the second computing device 104 is configured to access the computing device or devices on which the productivity software 101 resides.

Figure 2:
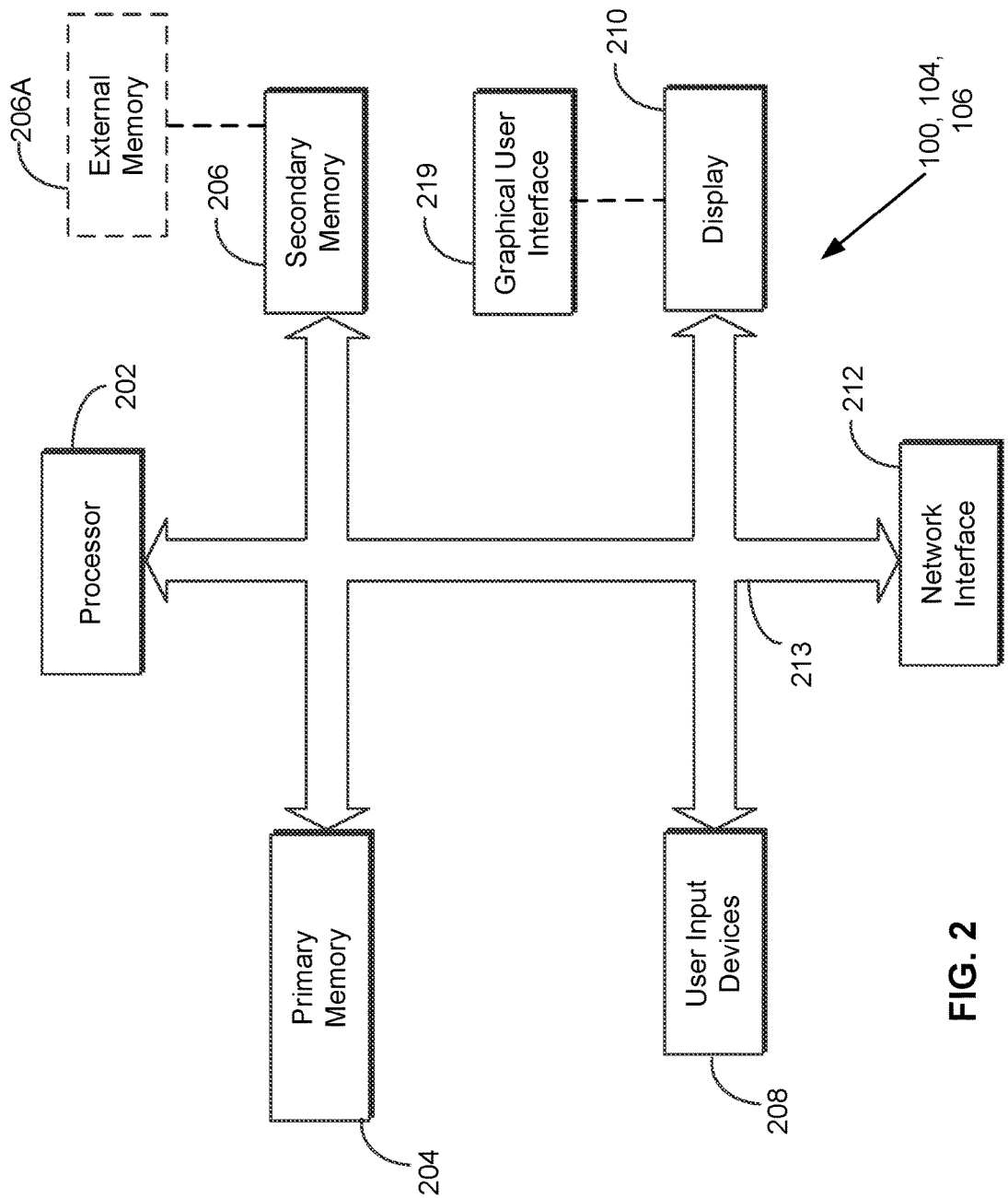
FIG. 2 is a block diagram of a computing device, according to an embodiment.

In one implementation, one or more of the computing devices of FIG. 1 have the general architecture shown in FIG. 2. The computing device includes processor hardware 202 (e.g., a microprocessor, controller, or application-specific integrated circuit) (hereinafter "processor 202 "), a primary memory 204 (e.g., volatile memory, random-access memory), a secondary memory 206 (e.g., non-volatile memory), user input devices 208 (e.g., a keyboard, mouse, or touchscreen), a display device 210 (e.g., an organic, light-emitting diode display), and a network interface 212 (which may be wired or wireless). Each of the elements of FIG. 2 is communicatively linked to one or more other elements via one or more data pathways 213. Possible implementations of the data pathways 213 include wires, conductive pathways on a microchip, and wireless connections. In an embodiment, the processor 202 is one of multiple processors in the computing device, each of which is capable of executing a separate thread. In an embodiment, the processor 202 communicates with other processors external to the computing device in order to initiate the execution of different threads on those other processors.

The memories 204 and 206 store instructions executable by the processor 202 and data. In some embodiments, the secondary memory 206 is implemented as, or supplemented by an external memory 206A. The media storage device 108 is a possible implementation of the external memory 206A. The processor 202 executes the instructions and uses the data to carry out various procedures including, in some embodiments, the methods described herein, including displaying a graphical user interface 219. The graphical user interface 219 is, according to one embodiment, software that the processor 202 executes to display a report on the display device 210, and which permits a user to make inputs into the report via the user input devices 208.

Figure 3:
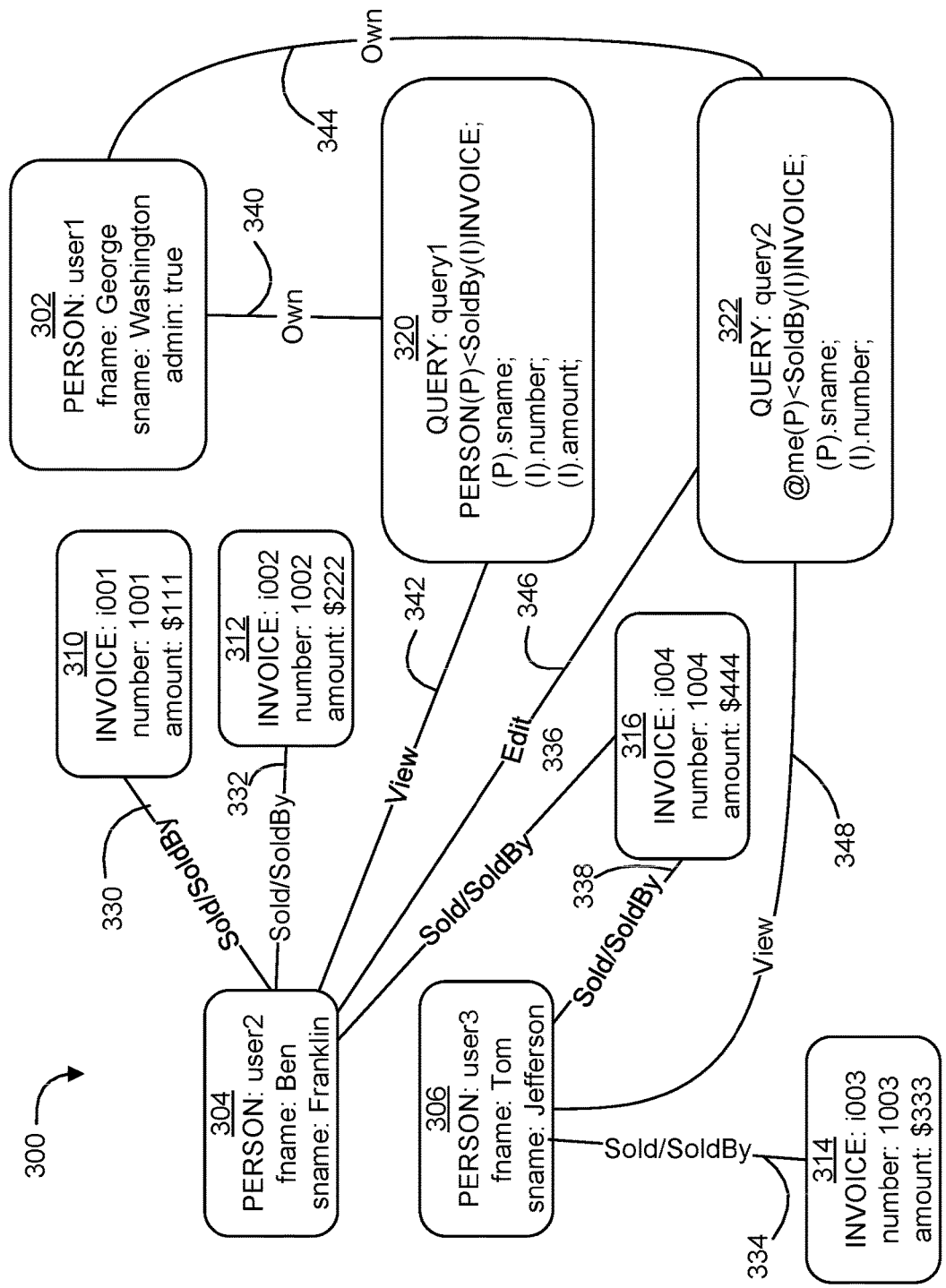
FIG. 3 is a diagram illustrating a database, according to an embodiment.

FIG. 3 is a diagram illustrating a database 300, according to an embodiment. In FIG. 3, the database 300 is shown as a graph database. In other embodiments, however, the database 300 can be implemented as another type of database, e.g., a relational database. In an embodiment, the database 300 is stored in the media storage device 108 of FIG. 1. In other embodiments, the database 300 is stored in another suitable storage device, e.g., the secondary memory 206 or the external memory 206A of FIG. 2A.

Referring to FIG. 3, the database 300 is a graph database that includes data nodes or data vertices. As used herein, a data node or a data vertex is a data point in a graph database (a network or graph of data). A graph database may include one or more data vertices. A graph database may also include edges that connect or relate one data vertex to another data vertex.

In an embodiment, a data vertex or a data node may be assigned a type. In FIG. 3, the database 300 include three types of data vertices: PERSON vertices 302, 304, and 306; INVOICE vertices 310, 312, 314, and 316; and QUERY vertices 320 and 322. In other implementations, the database 300 may include fewer or more types of data vertices. In an embodiment, each data vertex in the database 300 is represented by a unique identifier or ID. The form and syntax of the vertex ID may be arbitrary as long as the vertex ID is unique to the database or to the partitioned portion of the database. In the database 300, the respective IDs for the PERSON vertices 302, 304, and 306 are "user1", "user 2", and "user 3"; the respective IDs for the INVOICE vertices 310, 312, 314, and 316 are "i001", "i002", "i003", and "i004"; and the respective IDs for the QUERY vertices 320 and 322 are "query1" and "query 2".

In the embodiment shown in FIG. 3, data vertices of the database 300 have zero or more properties. As used herein, a property is an attribute of a data vertex. For example, each of the PERSON vertices 302, 304, and 306 has two properties: "fname" for first name and "sname" for surname. Furthermore, the PERSON vertex 302 also includes an "admin" property with a "true" value, indicating that user1 is an administrator of the database 300. As the administrator of the database 300, user1 of the PERSON vertex 302 may be granted certain privileges that are unavailable to other users. For example, user1 of the PERSON vertex 302 has access to all data vertices and edges in the database 300.

In some embodiments, the vertex properties may be standardized across all instances of data vertices of the same type. In FIG. 3, the INVOICE vertices 310, 312, 314, and 316 have the common properties of "number" for invoice number and "amount" for invoice amount. In other embodiments, the vertex properties may be unique to one data vertex, or the vertex properties may be common among a subset of data vertices of the same type.

Two data vertices are said to have a semantic relationship if there is a meaningful link defined between them within the database. In a graph database, two data vertices are semantically related if one data vertex can be reached by traversing the graph database starting at the other data vertex. For example, in the database 300, the PERSON vertex 304 and the INVOICE vertex 310 are semantically related, and the semantic relationship is represented by a Sold/SoldBy edge 330 which connects the PERSON vertex 304 with the INVOICE vertex 310. In other embodiments, two data vertices may be semantically related even if they are not directly connected via an edge (e.g., there are one or more edges and/or data vertices between the two data vertices), as long as one data vertex can be reached by traversing the database from the other data vertex in accordance with a query operation.

In an embodiment, the interpretation of an edge is dependent upon the traversal direction between data vertices in a database. For instance, when traversing from the PERSON vertex 304 to the INVOICE vertex 310, the Sold/SoldBy edge 330 is interpreted as "Sold", i.e., user1 of the PERSON vertex 304 sold invoice i001 of the INVOICE vertex 310. On the other hand, when traversing from the INVOICE vertex 310 to the PERSON vertex 304, the Sold/SoldBy edge 330 is interpreted as "SoldBy", i.e., invoice i001 of the INVOICE vertex 310 is sold by user1 of PERSON vertex 304. In an embodiment, the traversal direction of the edge may be specified in the query. In other embodiments, the system is configured to automatically determine the traversal direction based on the selected data vertices and edges.

In another embodiment, unlike the Sold/SoldBy edge 330 (which is a symmetrical or bidirectional edge), an edge may be unidirectional. For instance, the Sold/SoldBy edge 330 may be represented by two unidirectional edges: a Sold edge that begins at the PERSON vertex 304 and ends at the INVOICE vertex 310, and a SoldBy edge that begins at the INVOICE vertex 310 and ends at the PERSON vertex 304. The use of a bidirectional edge or a unidirectional edge is implementation dependent.

Referring to FIG. 3, the database 300 further includes Sold/SoldBy edge 332, Sold/SoldBy edge 334, Sold/SoldBy edge 336, and Sold/SoldBy edge 338. The Sold/SoldBy edge 332 connects the PERSON vertex 304 and the INVOICE vertex 312. The Sold/SoldBy edge 334 connects the PERSON vertex 306 and the INVOICE vertex 314. The Sold/SoldBy edge 336 connects the PERSON vertex 304 with the INVOICE vertex 316. The Sold/SoldBy edge 338 connects the PERSON vertex 306 with the INVOICE vertex 316. Since the additional Sold/SoldBy edges are interpreted in a similar manner as the Sold/SoldBy edge 330, descriptions of the interpretations of the additional Sold/SoldBy edges are omitted for brevity.

The database 300 also includes two QUERY vertices 320 and 322. FIG. 3 shows the QUERY vertices 320 and 322 as residing in the database 300. In other embodiments, however, the QUERY vertex 320 and/or the QUERY vertex 322 may reside in a separate portion of the database 300 or in a database separate from the database 300. Each QUERY vertex contains a query, which can be interpreted as a property of the QUERY vertex. In various embodiments, when a user is granted a certain type of permission to access a query, upon execution of the query on behalf of the user, the user is automatically granted the same type of permission to access the resultant data of the query. In other words, a query in a QUERY vertex serves as a data source in the database 300. In some embodiments, a QUERY vertex is also called a DataSource vertex. In various embodiments, a query is a type of traversal and defines a specific traversal pattern, and the resultant data of the query includes only data that satisfy the traversal pattern specified by the query. In FIG. 3, query1 of the QUERY vertex 320 and query2 of the QUERY vertex 322 in the database 300 are shown as having a particular syntax. However, another suitable query syntax may be used in other embodiments.

In the database 300, a query includes a traversal clause or a selection clause, which defines a traversal pattern and is used to identify the specific data vertices for inclusion in the resultant data set when the query is executed. Optionally, the query may include property clauses, which are used to identify properties of the specific vertices included in the resultant data set. For example, the QUERY vertex 320 contains query1, which is a query having a traversal or selection clause of "PERSON(P)<SoldBy(I)INVOICE". An interpretation of query1 of the QUERY vertex 320 is to select all data in the database 300 that match the traversal clause of query1, e.g., all the PERSON vertices that are related to an INVOICE vertex via a Sold/SoldBy edge (or all INVOICE vertices that are related to an PERSON vertex via a Sold/SoldBy edge). Query1 also include three property clauses: "(P).sname" for the "sname" property in each selected PERSON vertex, "(I).number" for the "number" property in each selected INVOICE vertex, and "(I).amount" for the "amount" property in each selected INVOICE node.

Unlike query1, query2 of the QUERY vertex 322 is a user-centric query. As used herein, a user-centric query is a query for data that is semantically related to and matches the query-defined traversal pattern with respect to a particular piece of data. In the embodiment shown in FIG. 3, the particular piece of data is a PERSON vertex representing the user executing the query, and thus the user-centric query only requests data that is semantically related to and matches the query-defined traversal pattern with respect to the particular user executing the query.

In more detail, query2 of the QUERY vertex 322 has a traversal clause of "@me(P)<SoldBy(I)INVOICE". An interpretation of query2 of the QUERY vertex 322 is to select the specific PERSON vertex that corresponds to the user executing query2, and to select all INVOICE vertices that are related to the selected PERSON vertex via a SoldBy edge. Query2 also includes two property clauses: "(P).sname" for the "sname" property in the selected PERSON vertex, and "(I).number" for the "number" property in each selected INVOICE vertex. In query2, the user-centric query is represented using the "@me" syntax, which indicates the specific PERSON vertex corresponding to the user who is executing the query. Advantageously, a single user-centric query can provide customized results, e.g., the results of query2 varies based on the user executing query2. Although "@me" is a syntax chosen in the embodiment shown in FIG. 3, in other embodiments, another suitable syntax may be used to the same effect.

In the embodiment shown in FIG. 3, the type of permission to access a query (and thus the resultant data set) is represented by an edge that connects or relates a PERSON vertex with a QUERY vertex. A "View" edge grants a user only permission to view the data in the resultant data set when the query is executed. An "Edit" edge grants a user permission to view and edit the data in the resultant data set when the query is executed. In an embodiment, granting a user "Edit" permission implicitly grants the user "View" permission as well. An "Own" edge not only grants a user permission to view and edit the data in the resultant data set when the query is executed but also grants the user permission to create, view, and edit the query itself. Although three different types of permissions or access controls are shown in FIG. 3, in other embodiments, other types of permissions and/or other interpretations of the permission types may be implemented.

In the database 300, user1 of the PERSON vertex 302 has the permission type of "Own" with respect to query1 of the QUERY vertex 320 and query2 of the QUERY vertex 322, as indicated by the Own edge 340 and the Own edge 344 respectively. On the other hand, user2 of the PERSON vertex 304 has the permission type of "View" with respect to query1 of the QUERY vertex 320 and the permission type of "Edit" with respect to query2 of the QUERY vertex 322, as indicated by the View edge 342 and the Edit edge 346 respectively. User3 of the PERSON vertex 306 has the permission type of "View" with respect to query2 of the QUERY vertex 322, as indicated by the View edge 348.

As discussed previously, user1 of the PERSON vertex 302 is the administrator of the database 300 and has access to all data vertices and edges in the database 300. In addition, when user1 creates query1 and query2, the Own edges 340 and 344 connect the PERSON vertex 302 with the QUERY vertices 320 and 322 respectively. As the owner of the queries, user1 can grant other users (e.g., user2 of PERSON vertex 304 and user3 of PERSON vertex 306) permission or access to the queries in the QUERY vertices 320 and 322 and the corresponding resultant data sets. In other embodiments, however, a user other than the database administrator may be an owner or a creator of a query.

When query1 of the QUERY vertex 320 is executed on behalf of user1, an example of the resultant data set available to user1 is shown in TABLE 1 below. Although TABLE 1 displays the type of permission user1 has with respect to the resultant data set ("Own"), in another embodiment, the permission type may be hidden.

TABLE 1

| PERSON.sname (Own) | INVOICE.number (Own) | INVOICE.amount (Own) |
| --- | --- | --- |
| Franklin | 1001 | $111 |
| Franklin | 1002 | $222 |
| Franklin | 1004 | $444 |
| Jefferson | 1003 | $333 |
| Jefferson | 1004 | $444 |

When user1 shares query1 with user2 with a "View" permission, the View edge 342 is created between the PERSON vertex 304 (corresponding to user2) and the QUERY vertex 320 (containing query1). When query1 is executed on behalf of user2, an example of the resultant data set available to user2 is shown in TABLE 2 below. The resultant data set of a query is dependent on the data accessible to the user who executes the query. Here, TABLE 2 displays the same data as TABLE 1. However, the type of permission shown in TABLE 2 ("View") is different from that shown in TABLE 1 ("Own"), since user2 only has the "View" permission with respect to the resultant data set of query1. In an embodiment, unlike user1, user2 can only view the data shown in TABLE 2 but cannot modify any of the data.

TABLE 2

| PERSON.sname (View) | INVOICE.number (View) | INVOICE.amount (View) |
| --- | --- | --- |
| Franklin | 1001 | $111 |
| Franklin | 1002 | $222 |

TABLE 2-continued

| PERSON.sname (View) | INVOICE.number (View) | INVOICE.amount (View) |
| --- | --- | --- |
| Franklin | 1004 | $444 |
| Jefferson | 1003 | $333 |
| Jefferson | 1004 | $444 |

Referring to FIG. 3, there is no edge connecting the PERSON vertex 306 (corresponding to user3) and the QUERY vertex 320, indicating that query1 was not shared with user3. Thus, user3 cannot execute query1 and has no permission or access to the resultant data set through query1.

Unlike query1, query2 of the QUERY vertex 322 is a user-centric query, which requests for data that has a semantic relationship with and matches the query-defined traversal pattern with respect to the data vertex corresponding to the user executing the query. When query2 is executed on behalf of user1, no resultant data set would be returned, since no INVOICE vertices and no Sold/SoldBy edges matches the traversal pattern specified by query2 (i.e., no INVOICE vertex is connected or related to the PERSON vertex 302 (corresponding to user1) via a Sold/SoldBy edge).

When user1 shares query2 with user2 with an "Edit" permission, the Edit edge 346 is created between the PERSON vertex 304 (corresponding to user2) and the QUERY vertex 322 (containing query2). When query2 is executed on behalf of user2, an example of the resultant data set available to user2 is shown in TABLE 3 below. Because query2 is a user-centric query, when query2 is executed on behalf of user2, the resultant data set includes only the PERSON vertex 304 and the INVOICE vertices 310, 312, and 316. The PERSON vertex 304 is returned because it is the PERSON vertex that corresponds to user2, the query executor. The INVOICE vertices 310, 312, and 316 are returned because they are the only INVOICE vertices that are connected to the PERSON vertex 304 via a Sold/SoldBy edge. In addition, TABLE 3 displays user2's permission with respect to the resultant data set as "Edit", indicating that user2 is permitted to modify, in addition to view, the data shown in TABLE 3.

TABLE 3

| PERSON.sname (Edit) | INVOICE.number (Edit) |
| --- | --- |
| Franklin | 1001 |
| Franklin | 1002 |
| Franklin | 1004 |

When user1 shares query2 with user3 with a "View" permission, the View edge 348 is created between the PERSON vertex 306 (corresponding to user3) and the QUERY vertex 322 (containing query2). When query2 is executed on behalf of user3, an example of the resultant data set available to user3 is shown in TABLE 4 below. Because query2 is a user-centric query, when query2 is executed on behalf of user3, the resultant data set includes only the PERSON vertex 306 and the INVOICE vertices 314 and 316. The PERSON vertex 306 is returned because it is the PERSON vertex that corresponds to user3, the query executor. The INVOICE vertices 314 and 316 are returned because they are the only INVOICE vertices that are connected to the PERSON vertex 306 via a Sold/SoldBy edge. In addition, TABLE 4 displays user3's permission with respect to the resultant data set as "View", indicating that user3 is permitted to only view the data shown in TABLE 4 but cannot modify the data.

TABLE 4

| PERSON.sname (View) | INVOICE.number (View) |
|---|---|
| Jefferson | 1003 |
| Jefferson | 1004 |

As TABLES 3 and 4 illustrate, the resultant data set of a user-centric query is dependent upon the identity of the user on behalf of whom the query is executed. In other words, via the user-centric query, a user executing the query sees only data that has a semantic relationship with and matches the query-defined traversal pattern with respect to the datum representing the user. The user-centric query enables a query creator to create a single query that can be executed by multiple users, yet when the query is executed, each user sees only data that is accessible to that particular user. Thus, there is no need for the query creator to create a unique query for each user individually.

In another embodiment, a user-specific data subset can be generated from the database to allow the user to interact with the data accessible to the user independent from other users. In an embodiment, a user-specific data subset is a copy of a portion of the database and may be temporarily stored in memory. The user-specific data subset is generated based on queries shared with or accessible to the user, and the user-specific data subset is populated with data from the resultant data sets of the queries.

In an alternative implementation, the user-specific data subset includes references to data in the database that are accessible to the user. The user-specific data subset is generated based on queries shared with or accessible to the user, and the user-specific data subset is populated with references to data from the resultant data sets of the queries. For example, the user-specific data subset may contain pointers to the data in the database that are accessible to the user.

Figure 4A:
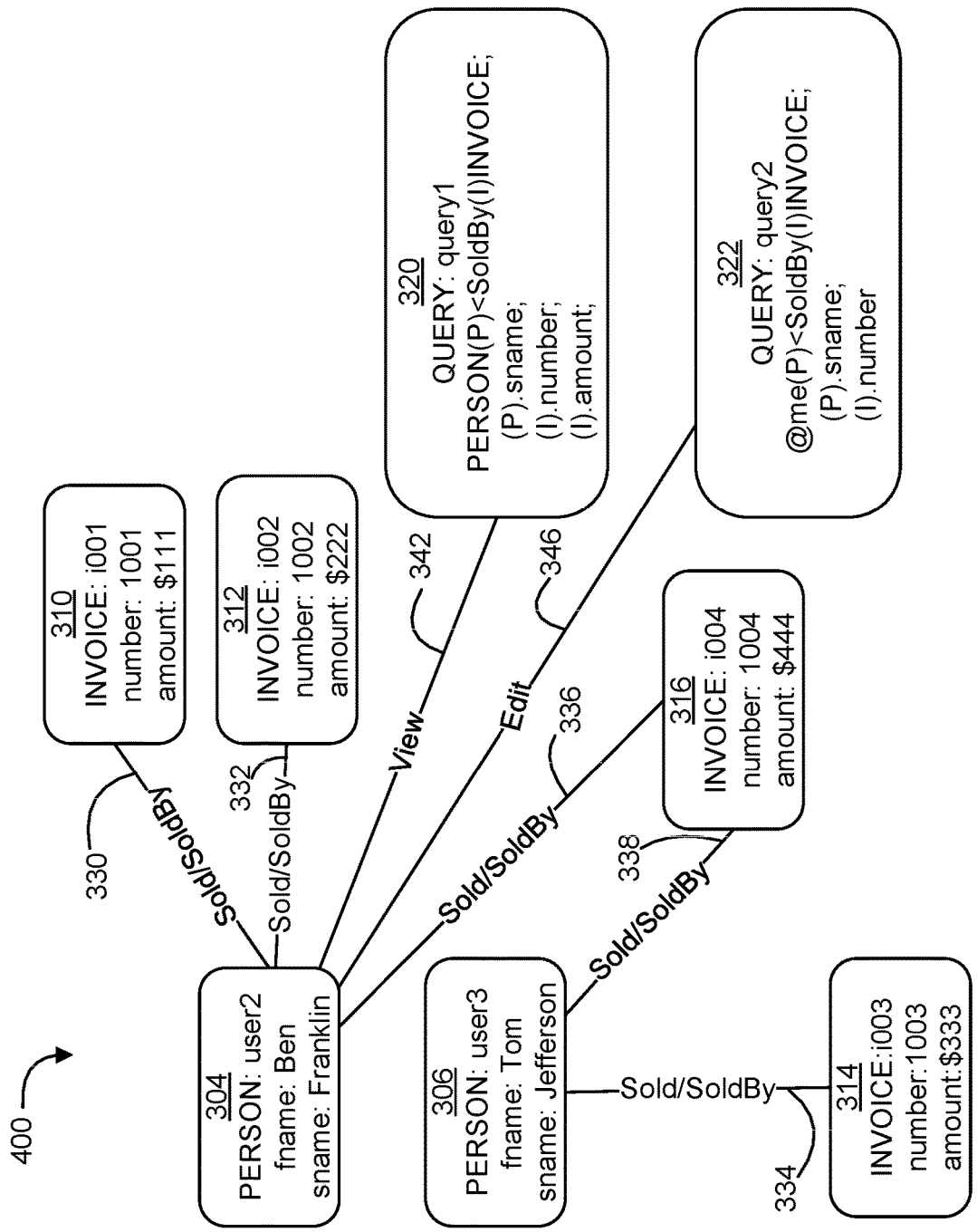
FIG. 4A is a diagram illustrating a data subset including data from the database of FIG. 3 that are accessible to a user, according to an embodiment.

FIG. 4A is a diagram illustrating a user-specific data subset 400 for user2, and the data subset 400 includes data from the database 300 of FIG. 3 that are accessible to user2, according to an embodiment. In an embodiment, a server (e.g., the first computing device 100 and/or the third computing device 106 of FIG. 1) is configured to generate the user-specific data subset 400 using the data in the database 300 when user2's identity is authenticated by the server. Then, the server is configured to identify in the database 300 the data vertex that corresponds to user2, i.e., the PERSON vertex 304. The server is further configured to identify all queries (or data sources) in the database 300 that are accessible to user2, i.e., all QUERY vertices that are related to the PERSON vertex 304 via a permission edge. In this case, the QUERY vertices include the QUERY vertex 320, which is related to the PERSON vertex 304 via the View edge 342, and the QUERY vertex 322, which is related to the PERSON vertex 304 via the Edit edge 346. After identifying the QUERY vertices, the server is configured to execute the queries contained in the QUERY vertices to determine the data in database 300 that are accessible to user2 (e.g., as if user2 is executing the queries in the database 300), and populate the user-specific data subset 400 with the resultant data sets of the queries. In an embodiment, the QUERY vertices accessible to the user are also added to the user-specific data subset 400. The server then stores the user-specific data subset 400 in memory (either temporarily or permanently) for use by user2.

In more detail, in FIG. 4A, when the server executes query1 of the QUERY vertex 320 to determine data that are accessible to user2, the resultant data set includes all the PERSON vertices that are connected to an INVOICE vertex via a Sold/SoldBy edge in the database 300. The resultant data set of query1 includes the PERSON vertices 304 and 306, the INVOICE vertices 310, 312, 314, and 316, and the Sold/SoldBy edges 330, 332, 336, and 338. When the server executes query2 (the user-centric query) of the QUERY vertex 322 to determine data that are accessible to user2, the resultant data set includes the specific PERSON vertex that corresponds to the user executing query2, and all INVOICE vertices that are connected to the selected PERSON vertex via a Sold/SoldBy edge. The resultant data set of query2 includes the PERSON vertex 304, the INVOICE vertices 310, 312, and 316, and the Sold/SoldBy edges 330, 332, and 336. The server is configured to combine the resultant data sets of query1 and query2 to generate the user-specific data subset 400 for user2, which includes the PERSON vertices 304 and 306, the INVOICE vertices 310, 312, 314, and 316, and the Sold/SoldBy edges 330, 332, 336, and 338.

Furthermore, the user-specific data subset 400 includes the QUERY vertices 320 and 322 as well as the View edge 342 and the Edit edge 346. The View edge 342 indicates that user2 has permission to "View" the resultant data set of query1, and the Edit edge 346 indicates that user2 has the permission to "Edit" the resultant data set of query2. Because the resultant data sets of query1 and query2 overlap, as both data sets include the PERSON vertex 304, the INVOICE vertices 310, 312, and 316, and the Sold/SoldBy edges 330, 332, and 336, user2 is granted different types of permission with respect to these pieces of data (i.e., "View" through query1 vs. "Edit" through query2). To resolve such permission conflict, in an embodiment, user2 is granted the more permissive type of permission with respect to these pieces of data (i.e., "Edit"). In another embodiment, user2 is granted the less permissive or more restrictive type of permission with respect to these data (i.e., "View"). In still other embodiments, a user may be granted two or more different types of permission or access to a particular piece of data, and the combination of these types of permission would be applied to the user's interaction with that piece of data.

In another embodiment, the user-specific data subset 400 contains references or pointers to the data from the database 300 that are accessible to user2. For example, instead of populating the data subset 400 with copies of data from the database 300, the data subset 400 is populated with references or pointers to the data vertices and/or edges of the resultant dataset of the queries. The data subset 400 may be further populated with references or pointers to the queries shared with or accessible to user2.

Figure 4B:
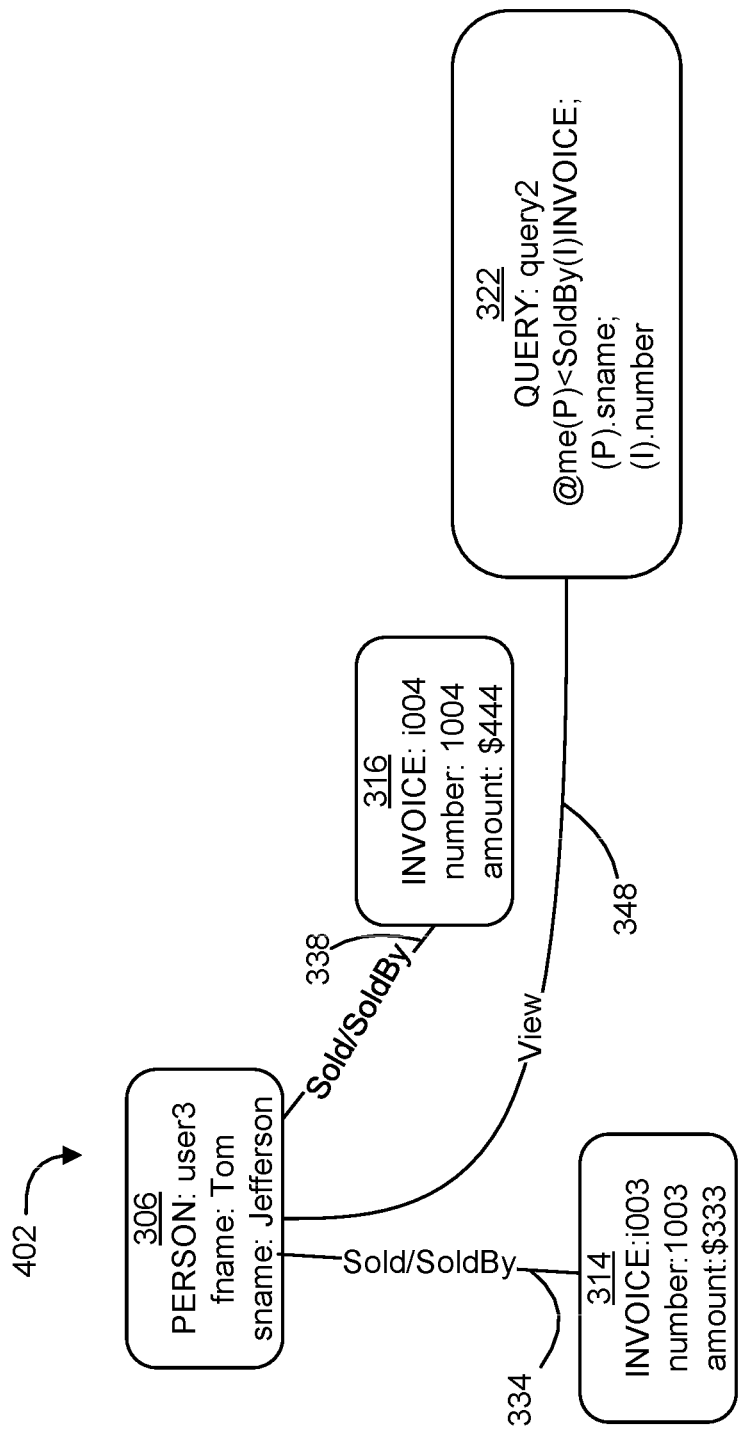
FIG. 4B is a diagram illustrating another data subset including data from the database of FIG. 3 that are accessible to another user, according to an embodiment.

FIG. 4B is a diagram illustrating a user-specific data subset 402 for user3, where the user-specific data subset 402 includes data from the database 300 of FIG. 3 that are accessible to user3, according to an embodiment. The server, in an embodiment, is configured to generate the user-specific data subset 402 using the data in the database 300 after user3's identity is authenticated by the server. Referring to FIG. 4B, the server is configured to identify in the database 300 the data vertex that corresponds to user3, i.e., the PERSON vertex 306. The server is also configured to identify all queries (or data sources) in the database 300 that are accessible to user3, i.e., all QUERY vertices that are related to the PERSON vertex 306 via a permission edge. The only query accessible to user3 is query2 of QUERY vertex 322, which is related to the PERSON vertex 306 via the View edge 348. Then, the server is configured to execute the query2 in the database 300 to determine data that are accessible to user3 (e.g., as if user3 is executing the query), and populate the user-specific data subset 402 with the resultant data set of query2. The resultant data set of query2 as executed on behalf of user3 includes the PERSON vertex 306, the INVOICE vertices 314 and 316, and the Sold/SoldBy edges 334 and 338. Thus, the user-specific data subset 402 for user3 includes the PERSON vertex 306, the INVOICE vertices 314 and 316, and the Sold/SoldBy edges 334 and 338. The user-specific data subset 402 also includes the QUERY vertex 306 and the View edge 348. The View edge 348 indicates that user3 has permission to "View" the resultant data set of query2.

In another implementation, the user-specific data subset 402 is populated with references or pointers to the data vertices and/or edges of the resultant dataset of the queries accessible to user3. The data subset 402 may be further populated with references or pointers to the queries shared with or accessible to user3.

In an embodiment, a user-specific data subset generated for user1 contains all the data in the database 300 of FIG. 3 or contains references to all the data in the database 300, because user1 is the administrator of the database 300 and has access to all data (vertices and edges) as well as all data sources (queries) in the database 300. In other embodiments, however, the user-specific data subset of the database administrator may be only a portion or subset of the database.

Because a user-specific data subset is generated for each authenticated user, each user may interact with the data in his or her user-specific data subset independently from other users. In some embodiments, a user can generate new queries that select only data or references in that user's user-specific data subset. In an embodiment, the user can share the generated new queries to other users. In another embodiment, the user may grant other users various types of permission to access the generated new queries and the resultant data set of the new queries. Furthermore, in another embodiment, the server is configured to generate any number of user-specific data subsets (e.g., generate the user-specific data subset for all users having access to the database) without identifying or authenticating the identity of a user.

Figure 5:
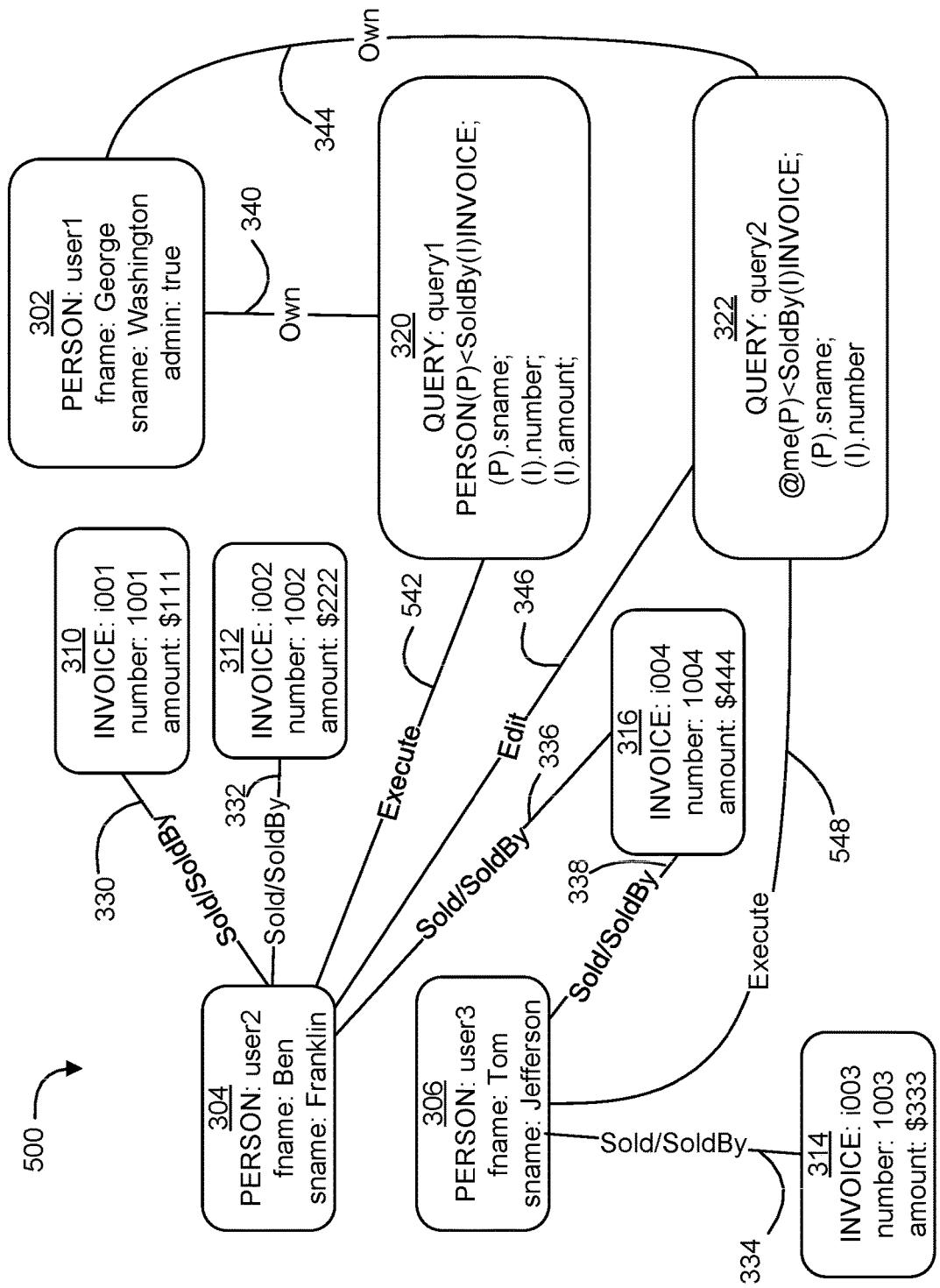
FIG. 5 is a diagram illustrating a database, according to another embodiment.

In another embodiment, it is desirable to allow a user to view the resultant data set of a query without populating the user's user-specific data subset with the data in the resultant data set or references to the data in the resultant data set. FIG. 5 is a diagram illustrating a database 500, according to another embodiment. The database 500 in FIG. 5 is discussed with reference to the database 300 of FIG. 3, and description of elements having the same reference numbers is omitted for brevity.

Unlike the database 300 of FIG. 3, the database 500 includes an Execute edge 542 (not the View edge 342) that connects the PERSON vertex 304 and the QUERY vertex 320, and an Execute edge 548 (not the View edge 348) that connects the PERSON vertex 306 and the QUERY vertex 322. In an embodiment, the Execute edge 542 indicates that user2 (corresponding to the PERSON vertex 304) is permitted to execute query1 contained in the QUERY vertex 320 and view the resultant data set of query1; however, the Execute edge 542 does not allow the actual data (e.g., the data vertices and edges) contained in the resultant data set (or references thereto) to be populated in user2's user-specific data subset. Similarly, the Execute edge 548 indicates that user3 (corresponding to the PERSON vertex 306) is permitted to execute query2 contained in the QUERY vertex 322 and view the resultant dataset of query2; however, the Execute edge 548 does not allow the actual data (e.g., the data vertices and edges) contained in the resultant data set (or references thereto) to be populated in user3's user-specific data subset.

In an embodiment, the Execute edge represents a "run-as-query-creator" mode. The "run-as-query-creator" mode allows a query creator to share a query with another user without populating the other user's user-specific data subset with data in the resultant data set of the query. When a query is executed in the "run-as-query-creator" mode, the query is executed using data that are accessible to the query creator (e.g., the data in the query creator's user-specific data subset), but not using the data that are accessible to the user who is executing the query (e.g., using the data in the user's user-specific data subset which may be different from the data accessible to the query creator). This mode is useful when a query creator wishes to provide the user a read-only report of some of the data that is accessible to the query creator. The "run-as-query-creator" mode is further discussed with respect to FIGS. 6A and 6B.

Figures 6A, 6B:
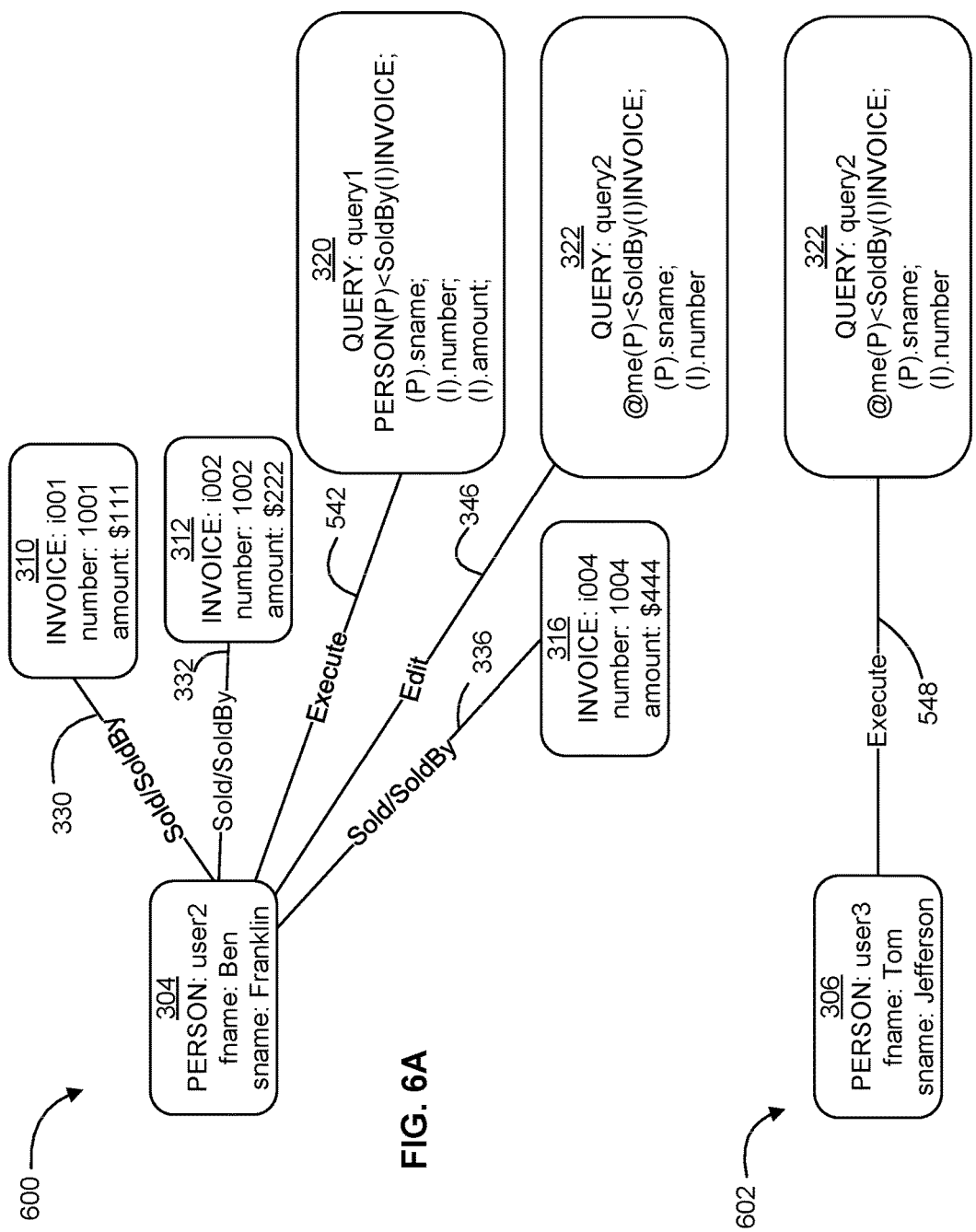
FIG. 6A is a diagram illustrating a data subset including data from the database of FIG. 5 that are accessible to a user, according to an embodiment.
FIG. 6B is a diagram illustrating another data subset including data from the database of FIG. 5 that are accessible to another user, according to an embodiment.

FIG. 6A is a diagram illustrating a user-specific data subset 600 for user2, and the user-specific data subset 600 includes data from the database 500 of FIG. 5 that are accessible to user2, according to an embodiment. In another embodiment, the data subset 600 includes references or pointers to data from the database 500 that are accessible to user2. The user-specific data subset 600 includes the PERSON vertex 304, which corresponds to user2. The user-specific data subset 600 also includes the QUERY vertex 320, which is connected to the PERSON vertex 304 via the Execute edge 542, and the QUERY vertex 322, which is connected to the PERSON vertex 304 via the Edit edge 346. When the server executes query1 of the QUERY vertex 320, the server does not populate the user-specific data subset 600 with the data (or references thereof) contained in the resultant data set. When the server executes query2 of the QUERY vertex 322 as user2, the server populates the user-specific data subset 600 with the data contained in the resultant data set. Thus, the user-specific data subset 600 further includes the PERSON vertex 304, the INVOICE vertices 310, 312, and 316, and the Sold/SoldBy edges 330, 332, and 336, which compose the resultant data set of query2.

In an embodiment, when a user executes a query in the "run-as-the-query-creator" mode, the server executes the query not in the data subset of the user but in the data subset of the query creator. For instance, when user2 executes query1 in the "run-as-query-creator" mode, the server executes query1 in the user-specific data subset of user1, who is the creator of query1, but not in user2's user-specific data subset 600. As the administrator of the database 500, user1's user-specific data subset contains the same data (or references to the data) as the database 500. After executing query1 in the data subset of user1, the server is configured to generate a report of the resultant data set and to display the generated report to user2. An example of the generated report for user2 when query1 is executed in the "run-as-query-creator" mode is shown in TABLE 5 below.

TABLE 5

| PERSON.sname | INVOICE.number | INVOICE.amount |
|---|---|---|
| Franklin | 1001 | $111 |
| Franklin | 1002 | $222 |
| Franklin | 1004 | $444 |
| Jefferson | 1003 | $333 |
| Jefferson | 1004 | $444 |

Furthermore, query1 of the QUERY vertex 320 includes the "sname" property of PERSON vertices and the "number" and "amount" properties of INVOICE vertices, but does not include the "fname" property of PERSON vertices. In an embodiment, the generated report for user2 would display only the properties that were explicitly identified in the query, such as the properties shown in TABLE 5 above.

FIG. 6B is a diagram illustrating a user-specific data subset 602 for user3, and the user-specific data subset 602 includes data from the database 500 of FIG. 5 that are accessible to user3, according to an embodiment. In another embodiment, the data subset 602 includes references to data from the database 500 that are accessible to user3. The user-specific data subset 602 includes the PERSON vertex 306 (corresponding to user3) connected to the QUERY vertex 322 via the Execute edge 548. When the server executes query2 of the QUERY vertex 322, the data contained in the resultant data set are not populated in user3's user-specific data subset 602. Thus, the user-specific data subset 600 does not include any additional data (e.g., data vertices or edges).

In an embodiment, when user3 executes query2 in the "run-as-query-creator" mode, the server executes query2 in the data subset of user1 because user1 is the query creator, and user1's user-specific data subset includes the same data as the database 500. After executing query2 in user1's data subset, the server is configured to generate a report of the resultant data set and to display the generated report to user3.

However, in the embodiments shown in FIGS. 5 and 6B, the generated report for user3 would display no data. This is because query2 of QUERY vertex 322 is a user-centric query, the server is executing query2 in the "run-as-query-creator" mode (i.e., as user1), and user1's corresponding PERSON vertex 302 is not semantically related to any INVOICE vertices via any Sold/SoldBy edges in the database 500 and thus the traversal pattern specified by query2 is not met. In contrast, in the embodiments shown in FIGS. 3 and 4B, user3 would be able to view the data as previously shown in TABLE 4, as the View edge 348 allows the server to execute query2 as user3 in user3's user-specific data subset 402, not in the "run-as-query-creator" mode.

Furthermore, in the "run-as-query-creator" mode, a user may delegate to another user the authority to share a query in the "run-as-query-creator" mode. For example, user1 is the owner and creator of a query. User1 shares the query with user2 via the "run-as-query-creator" mode. User1 also delegates to user2 the authority to share the query with user3, but only via the "run-as-query-creator" mode. When user2 executes the query, the query is executed using user1's data subset and no change is made to user2's data subset. Likewise, when user3 executes the query, the query is executed using user1's data subset and no change is made to user3's data subset. This approach allows user2 and user3 to view the report as user1 would view it. Put in another way, this approach enables user1 to delegate to user2 the right to distribute view-only reports (using data in user1's data subset) to other users, without populating the other user's data subsets with the underlying data. In a further embodiment, user1 may delegate to user2 the right to delegate to user3 the right to share the query with user 4.

Figure 7:
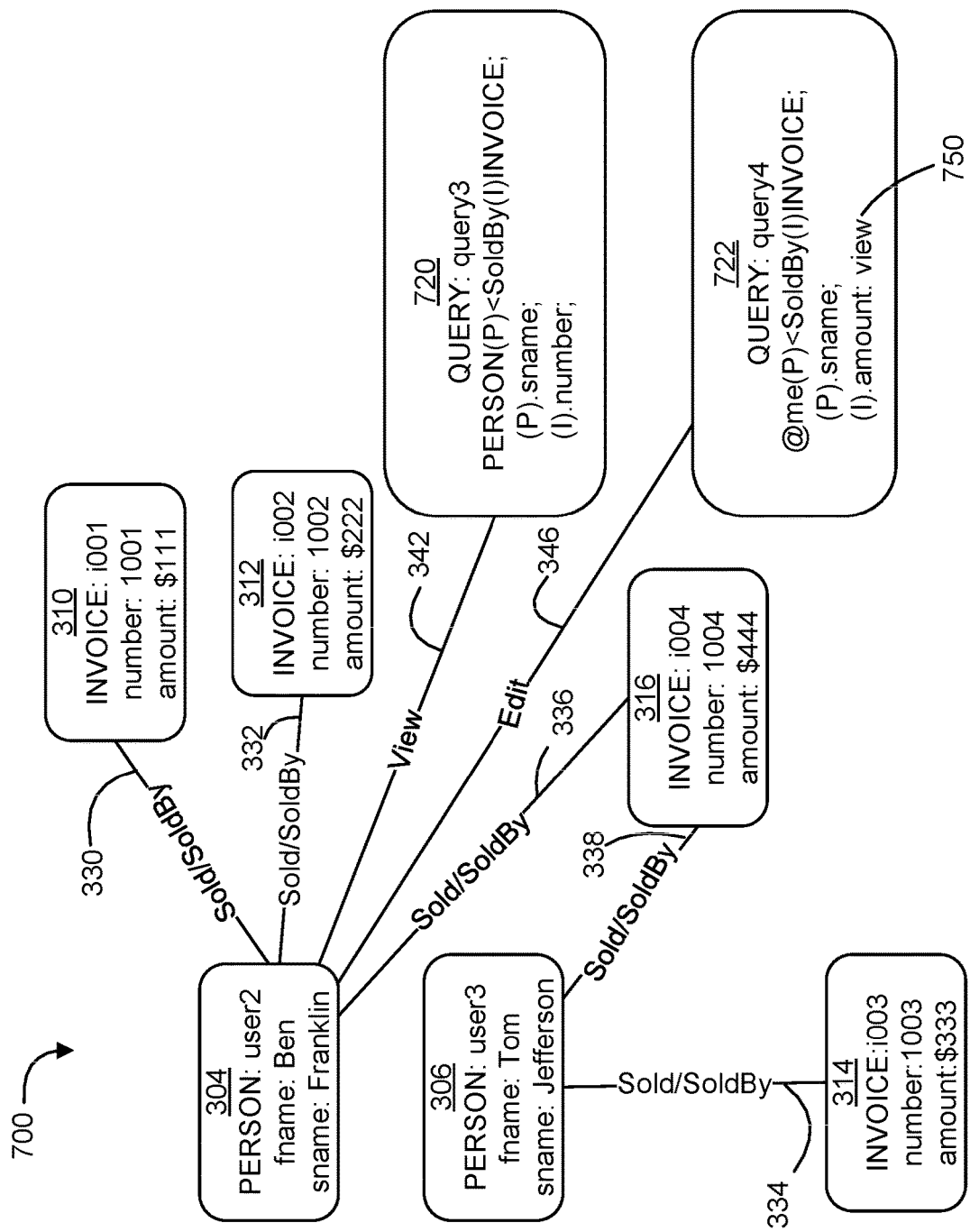
FIG. 7 is a diagram illustrating a data subset including data that are accessible to a user, according to another embodiment.

In various embodiments, permission or access to data can be granted at the property or edge level, in addition to being granted at the data vertex level. FIG. 7 is a diagram illustrating a user-specific data subset 700 for user2, and the user-specific data subset 700 includes data that are accessible to user2, according to an embodiment. In another embodiment, the data subset 700 includes references or pointers to data that are accessible to user2. The user-specific data subset 700 of FIG. 7 is discussed with reference to the user-specific data subset 400 of FIG. 4A, and description of elements having the same reference numbers is omitted for brevity.

The user-specific data subset 700 of user2 includes two QUERY vertices 720 and 722. The QUERY vertex 720 includes query3, which is a query having a traversal clause of "PERSON(P)<SoldBy(I)INVOICE". An interpretation of query3 is to select all the PERSON vertices and INVOICE vertices that are related to each other via a Sold/SoldBy edge. Query3 also include two property clauses: "(P).sname" for the "sname" property in each selected PERSON vertex, and "(I).number" for the "number" property in each selected INVOICE vertex. Furthermore, the QUERY vertex 720 is semantically related to the PERSON vertex 304 (corresponding to user2) via the View edge 342. When the server executes query3 of the QUERY vertex 720, user2 is granted the "View" permission to the resultant data set of query3.

Also in the user-specific data subset 700, the QUERY vertex 722 includes query4, which is a user-centric query having a traversal clause of "@me(P)<SoldBy(I)INVOICE". An interpretation of query4 is to select the specific PERSON vertex that corresponds to the user executing query4, and to select all INVOICE vertices that are related to the selected PERSON vertex via a Sold/SoldBy edge. Query4 also includes two property clauses: "(P).sname" for the "sname" property in the selected PERSON vertex, and "(I).amount" for the "amount" property in each selected INVOICE vertex. In addition, the QUERY vertex 722 is related to the PERSON vertex 304 via the Edit edge 346. When the server executes query4 of the QUERY vertex 722, user2 is granted the "Edit" permission to the resultant data set of query4.

However, query4 of the QUERY vertex 722 further includes a property permission clause 750 of "view" following the property clause "(I).amount". An interpretation of the property permission clause 750 is that a user can "view" the value of the "amount" property in each selected INVOICE vertex. The "view" permission for the "(I).amount" property granted the property permission clause 750 thus conflicts with the "Edit" permission granted by the Edit edge 346. In an embodiment, the permission granted to the specific property overrides the permission granted to the query. In FIG. 7, when the server executes query4 of the QUERY vertex 722, user2 is granted the "view" permission to the "amount" property in each selected INVOICE vertex and the "edit" permission to the remaining data in the resultant data set of query4. An example of the generated report for user2 when query4 is executed is shown in TABLE 6 below. In another embodiment, the permission granted to the query (e.g., "Edit" through the Edit edge 346) overrides the permission granted to the specific property (e.g., "view" through the property permission clause 750).

TABLE 6

| PERSON.sname (Edit) | INVOICE.amount (View) |
|---|---|
| Franklin | $111 |
| Franklin | $222 |
| Franklin | $444 |

In addition, when query3 and query4 are both executed (e.g., to generate the user-specific data subset 700 for user2), the resultant data sets of the two queries partially overlap, as both data sets include the PERSON vertex 304, the INVOICE vertices 310, 312, and 316, and the Sold/SoldBy edges 330, 332, and 336 in FIG. 7. User2 is granted different types of permission with respect to these pieces of data (i.e., "View" through the View edge 342 for query3 vs. "Edit" through the Edit edge 346 for query4). Furthermore, as discussed previously, within query4, there is a conflict between the permission granted to the query ("Edit") and the permission granted to the property "(I).amount". In an embodiment, to resolve such permission conflict, the server is configured to first resolve the permission conflicts between the different queries, and then resolve the permission conflict between query and property. For example, in FIG. 7, as between the queries, user2 is granted the more permissive type of permission with respect to the overlapping data (i.e., "Edit"). As between query4 and the property " (I). amount", user2 is granted the "view" permission for the "amount" property of the selected INVOICE vertices in the resultant data set of query4. An example of the generated report for user2 when query3 and query4 are executed is shown in TABLE 7 below.

TABLE 7

| PERSON.sname | INVOICE.number | INVOICE.amount |
|---|---|---|
| Franklin | (1001) | $(111) |
| Franklin | (1002) | $(222) |
| Franklin | (1004) | $(444) |
| (Jefferson) | (1003) | |
| (Jefferson) | (1004) | |

In TABLE 7, a "( )" indicates that the data value is view-only, while the data values without a "( )" are editable. In the "PERSON.sname" column, user2 is granted permission to "Edit" his own surname through the user-centric query query4 of the QUERY vertex 722 and the Edit edge 346. User2 is granted permission to only "View" the surname of user3 through the query3 of the QUERY vertex 720 and the View edge 346, since the surname of user3 is only included in the resultant data set of query3 but not query4. In the "INVOICE.number" column, user2 is granted permission to "View" the invoice number through query3 of the QUERY vertex 720 and the View edge 346. In the "INVOICE. amount" column, user2 is granted permission to "view" the invoice amount through query4 of the QUERY vertex 722 and the property permission clause 750. In TABLE 7, no data is displayed in the "INVOICE. amount" for user3's invoices, because neither query3 nor query4 includes the data corresponding to user3's invoice amounts. In another embodiment, however, user3's invoice amounts may be displayed as view-only because user2 is granted permission to "View" the INVOICE vertices related to the PERSON node corresponding to user3 via query3.

In addition to granting permissions to specific properties of data, the server is also configured to grant permission to edges. For example, query3 can be modified to further include an edge clause "(I)@edge: write". An interpretation of the edge clause is that a user is granted the permission to "create" and/or "delete" Sold/SoldBy edges that relate the selected PERSON vertices and the selected INVOICE vertices included in the resultant data set of query3. For example, the above edge clause grants user2 the permission to create a Sold/SoldBy edge between the PERSON vertex 306 and the INVOICE vertex 310. Similarly, a user may be granted permission to create and/or delete data vertices. In an embodiment, user2 of the PERSON vertex 304 may be granted the permission to create a new INVOICE vertex. When user2 is granted the permission to "write" a new edge and the permission to "write" a new data vertex, in an embodiment, user2 is able to create a new INVOICE vertex and the corresponding Sold/SoldBy edge to the newly created INVOICE vertex.

In various embodiments, when a user modifies data (e.g., edits a piece of existing data or creating a piece of new data), the server is configured to update the main database with the modified data and then regenerate the user-specific data subset of that user and any other user-specific data subset that is affected by the modified data. In some embodiments, only a portion of the user-specific data subset affected by the changed data is regenerated. In another embodiment, the user-specific data subset is modified with the changed data but not regenerated.

Figures 8A, 8B, 8C:
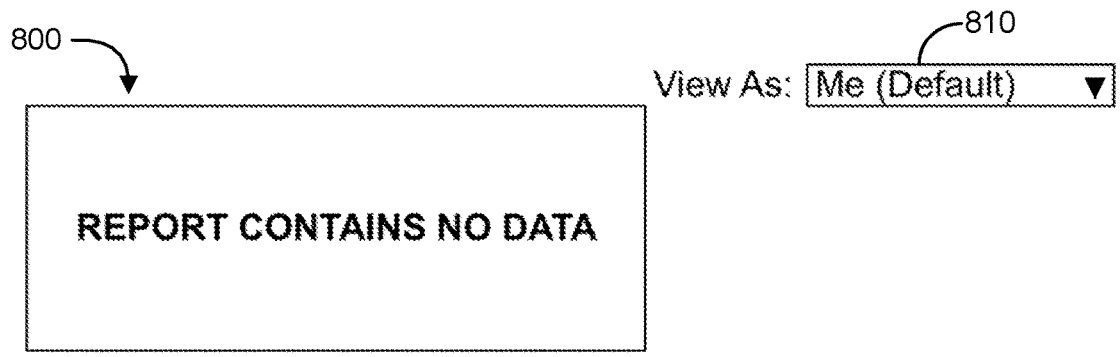
FIG. 8A is a table illustrating an output report when a user-centric query is executed by a user, according to an embodiment.
FIG. 8B is a table illustrating an output report that includes all data from the user-centric query, according to an embodiment.
FIG. 8C is a table illustrating an output report that includes some data from the user-centric query in a preview mode, according to an embodiment.

When a database administrator creates a user-centric query, the query creator may wish to preview the data that is accessible to various users when the query is executed on behalf of each user. FIGS. 8A-8C are tables illustrating output reports when a query creator previews resultant data of a user-centric query, according to an embodiment. FIGS. 8A-8C are discussed with reference to the database 300 of FIG. 3. In particular, the query creator in the embodiment of FIGS. 8A-8C is user1 of FIG. 3., and the user-centric query is query2 of the QUERY vertex 322 in the database 300.

FIG. 8A is a table illustrating an output report 800 when the user-centric query query2 is executed by user1 in a preview mode, according to an embodiment. When query2 is executed by user1, the server is configured to select the specific PERSON vertex that corresponds to user1 (i.e., the PERSON vertex 302), and to select all INVOICE vertices that are connected to the PERSON vertex 302 via a Sold/SoldBy edge. However, as shown in FIG. 3, the PERSON vertex 302 is not connected to any INVOICE vertices and thus the traversal pattern specified by query2 is not met. Accordingly, when user1 executes query2, there is no data in the resultant dataset and no data is displayed in the output report 800.

In the embodiments shown in FIGS. 8A-8C, the output report display includes a user-selection menu 810. The user-selection menu 810 includes a list of users, and a report viewer (e.g., user1) can select a specific user, all users, or a group of users from the list. Once the user or users of interest are selected, the output report is updated to display data that are accessible to the selected user or users. In FIG. 8A, when the query is executed by user1, the user-selection menu 810 displays "Me (Default)" (i.e., the executor of the query), indicating that the output report 810 is displaying data that is accessible to user1. Although the user-selection menu 810 is shown as a drop-down menu in FIGS. 8A-8C, other suitable menus (e.g., a text input bar) may be implemented in other embodiments.

FIG. 8B is a table illustrating an output report 802 that includes data from all users when the user-centric query query2 is executed in a preview mode, according to an embodiment. As previously discussed, user1 is an administrator of the database 300 and thus has access to all data contained in the database 300. In FIG. 8B, user1 selects from the user-selection menu 810 "All Users". In response to the selection, the server is configured to retrieve data in the database 300 for all users that satisfy the traversal or selection clause of query2. The server is then configured to display the data in the output report 802 for preview by user1. As shown in FIG. 8B, the output report 802 displays the surname of both user2 and user3, as well as the invoice numbers of the invoices sold by user2 and user3.

FIG. 8C is a table illustrating an output report 804 that includes data accessible to user2 from the user-centric query query2 is executed in a preview mode, according to an embodiment. Here, user1 selects from the user-selection menu 810 "Ben Franklin", i.e., user2's name. In response to the selection, the server is configured to execute query2 as user2, and to retrieve data in the database 300 that are accessible to user2 and satisfy the traversal clause of query2. The server is then configured to display the data in the output report 804 for preview by user1. As shown in FIG. 8C, the output report 804 displays the surname of user2 and the invoice number of the invoices sold by user2.

Figure 9A:
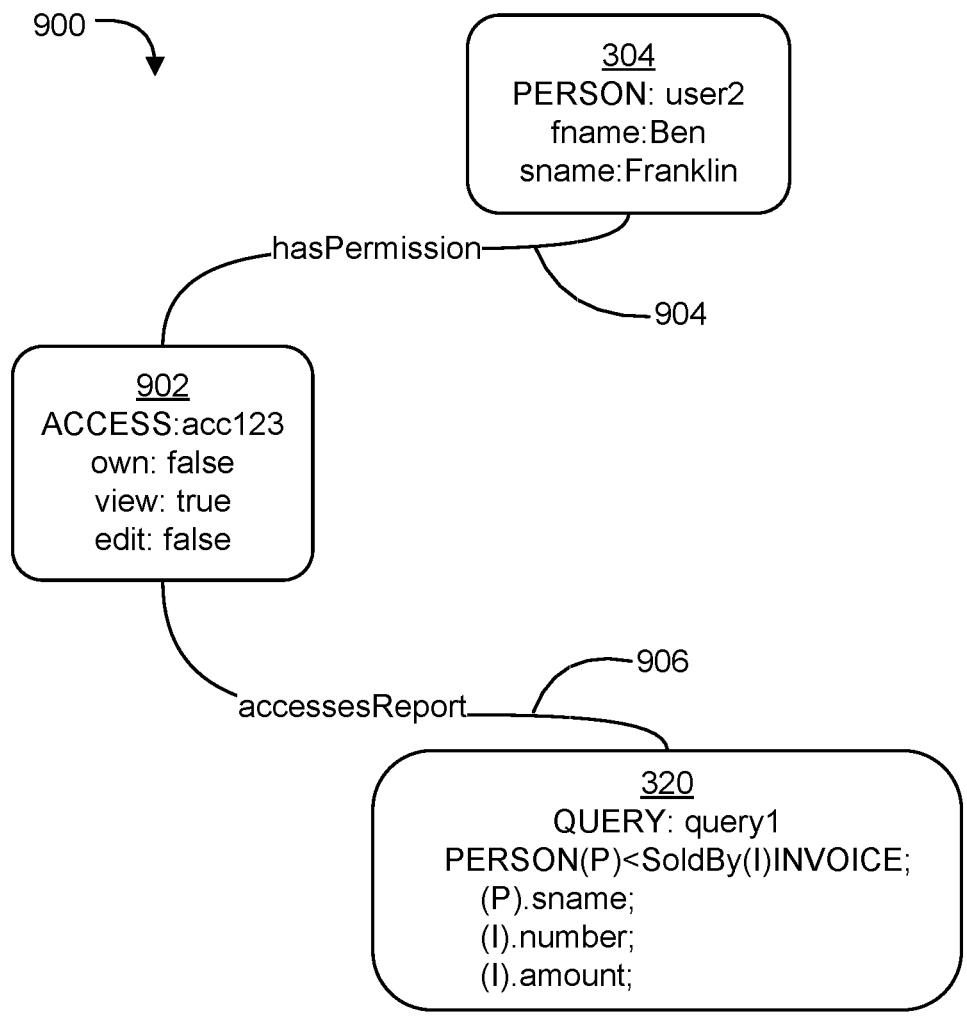
FIG. 9A is a diagram illustrating a portion of a database, according to an embodiment.

FIG. 9A is a diagram illustrating a portion of a database 900, according to an embodiment. FIG. 9A is discussed in reference to FIG. 3, and description of elements having the same reference numbers is omitted for brevity. While FIG. 3 illustrates user permission information as edges, in FIG. 9A, user permission information (e.g., "own", "edit", "view", etc.) may be represented as a data vertex or data vertices of type ACCESS. For example, ACCESS vertex 902 has a vertex ID of "acc123". The ACCESS vertex 902 has properties representing the permission type and state of control, e.g., "view:true". The ACCESS vertex 902 is semantically related to PERSON vertex 304 via a hasPermission edge 904. Furthermore, the ACCESS vertex 902 is also semantically related to the QUERY vertex 320 via an accessReport edge 906. An interpretation of the database portion 900 is that user2 (corresponding to the PERSON vertex 304) has access to query1 of QUERY vertex 320 with the permission designated in the ACCESS vertex 902. This example is logically equivalent to the View edge 342 as depicted in FIG. 3.

In another embodiment, the types of permissions or access controls may include a permission expiration date or a time period for which the permission is to remain valid. For example, a user may be granted permission to view the data in the results data set for a predefined time period (e.g., 30 days). As another example, a user may be granted permission to edit the data until the end of a quarter (e.g., on or before December 31). When the predefined time period is over or when the permission expiration date is reached, the type of permission granted to the user may be rescinded (e.g., the user can no longer view the data) or changed (e.g., the user can no longer edit the data but can still view the data).

Figure 9B:
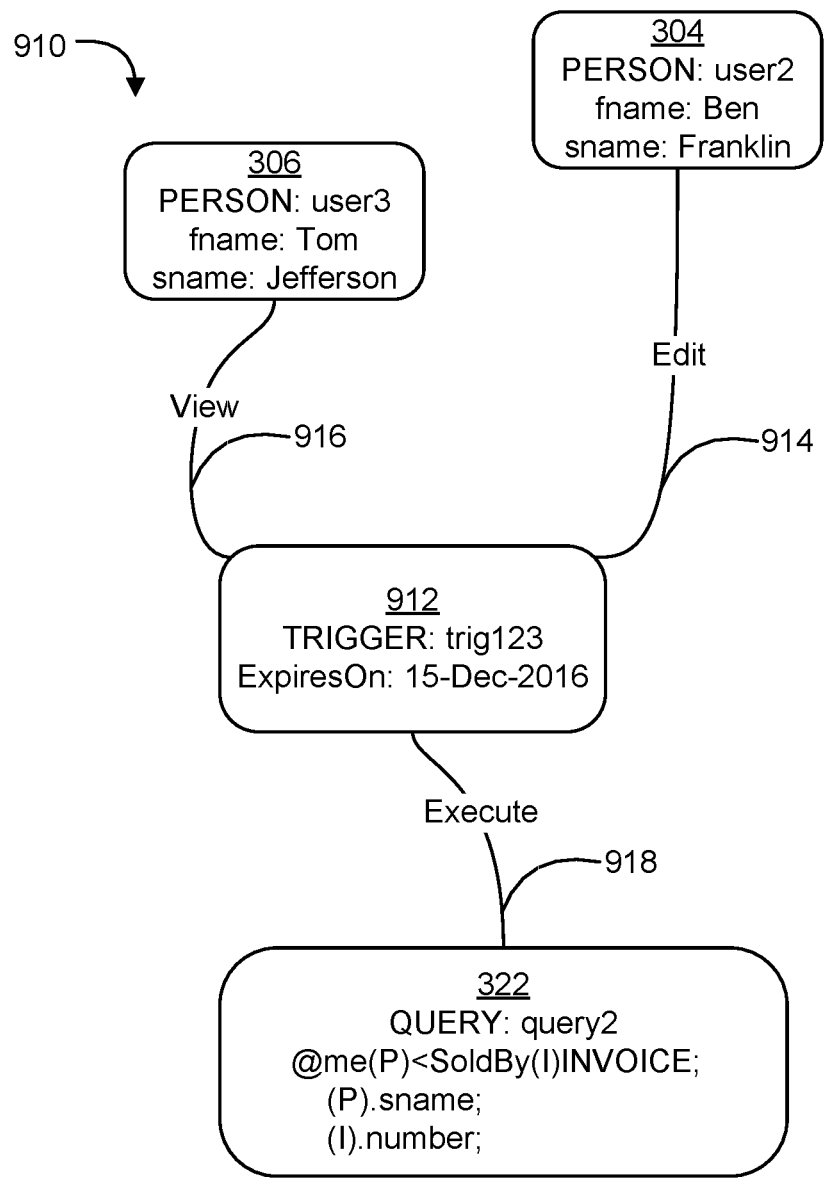
FIG. 9B is a diagram illustrating a portion of a database, according to another embodiment.

For example, FIG. 9B is a diagram illustrating a portion of a database 910, according to an embodiment. FIG. 9B is discussed in reference to FIG. 3, and description of elements having the same reference numbers is omitted for brevity. The database 910 includes a TRIGGER vertex 912. A TRIGGER vertex contains information of events that trigger a change in permission or access to data. In addition, the TRIGGER vertex 912 is connected to the PERSON vertex 304 via an Edit edge 914, to the PERSON vertex 306 via an View edge 916, and to the QUERY vertex 322 via an Execute edge 918. The TRIGGER vertex 912 has a vertex ID of "trig123" and an expiration date property "ExpiresOn". The expiration data property indicates the date on which the type of permission granted to a user may be rescinded or changed. In the database 910, the expiration date in the TRIGGER vertex 912 is set as "15-Dec-2016". Accordingly, traversing from the PERSON vertex 304 to the QUERY vertex 322 indicates that user2 is granted the permission to "Edit" the resultant data of query2 when query2 is executed before Dec. 15, 2016. Traversing from the PERSON vertex 306 to the QUERY vertex 322 indicates that user3 is granted the permission to "View" the resultant data of query2 when query2 is executed before Dec. 15, 2016. In an embodiment, on Dec. 15, 2016, the TRIGGER vertex 912 will be deleted automatically, severing the relationship between the PERSON vertices and the Query vertex 322, and thereby terminating the permissions granted to user2 and user3. The Edit edge 914, the View edge 916, and the Execute edge 918 may also be deleted when the TRIGGER vertex 912 is deleted.

In another embodiment, permission may be granted via access roles and edit rules. An access role is an arbitrarily-defined group of users. Examples include "All Employees," "All Users," "All Accounting," "Document Owners," and "Document Editors." An edit rule is a rule that defines (a) which of the results the user may see, and (b) what sort of actions the user may take with respect to the results. The edit rule may override any previously-existing rule.

Figure 9C:
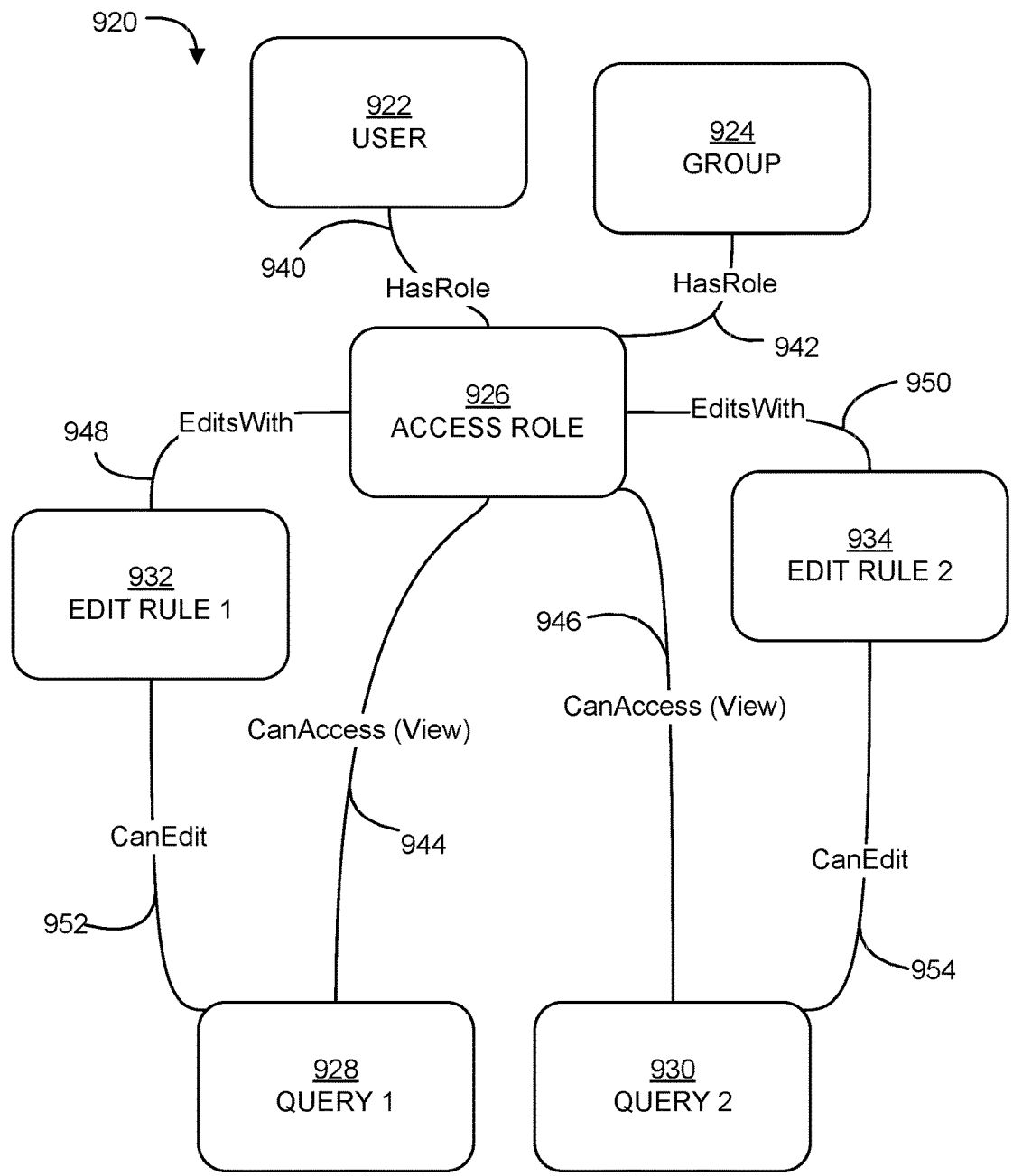
FIG. 9C is a diagram illustrating a portion of a database, according to another embodiment.

Turning to FIG. 9C, which depicts a diagram illustrating a portion of a database 920, access roles and edit rules implemented according to an embodiment will now be described. The database 920 includes a USER vertex 922, which represents a single user, and a GROUP vertex 924, which represents a group of users. The USER vertex 922 and the GROUP vertex 924 are semantically related to an ACCESS ROLE vertex 926 via HasRole edge 940 and HasRole edge 942, respectively. An ACCESS ROLE vertex groups together the vertices representing individual user(s) and/or group(s) of users who should be granted the same type of permission to access certain query results. Here, the ACCESS ROLE vertex 926 represents an access role that has permission to access the resultant data of the queries in the QUERY 1 vertex 928 and the QUERY 2 vertex 930. Although the ACCESS ROLE vertex 926 is connected to one USER vertex and one GROUP vertex, in other embodiments, any number (zero or more) of USER vertices or GROUP vertices may be connected to an ACCESS ROLE vertex.

In an implementation, if an access role is granted permission to access a query's results, then a default-permission edge is generated between the ACCESS ROLE vertex corresponding to the access role and the QUERY vertex corresponding to the query. In FIG. 9C, the ACCESS ROLE vertex 926 is connected to the QUERY 1 vertex 928 and the QUERY 2 vertex 930 via the CanAccess edges 944 and 946, respectively. CanAccess edges 944 and 946 are assigned permission type of "view", which is the most restrictive type of permission. In other embodiments, the CanAccess edges may be assigned another type of permission, such as "edit" or "own".

The database 920 further includes EDIT RULE 1 vertex 932 and EDIT RULE 2 vertex 934. Each of EDIT RULE 1 vertex 932 and EDIT RULE 2 vertex 934 contains a permission rule that may be different from the type of permission already granted by the CanAccess edges 944 and 946. For example, EDIT RULE 1 vertex 932 may contain a permission rule that allows the user(s) having the access role of the ACCESS ROLE vertex 926 to edit the resultant data of the query in the QUERY 1 vertex 928. Similarly, EDIT RULE vertex 934 may contain a permission rule that allows the user(s) having the access role of the ACCESS ROLE vertex 926 to edit the resultant data of the query in the QUERY 2 vertex 930. The permission rule in an EDIT RULE vertex may allow user(s) having a particular access role to edit all or a portion of the data in the query result (e.g., edit certain resultant data vertices, edit certain properties of some data vertices, edit certain edges, add or delete data vertices and/or properties of data vertices).

Turning to FIG. 10A, an example of a user interface that may be used (e.g., on the computing device 104) to establish and configure edit rules according to an embodiment will now be described. The user interface 1000 includes a rule definition panel 1002 that allows a user to enter the name of the rule, a description for the rule, which columns of a report the rule applies to, and any filters that apply. The edit rule established via the rule definition panel 1002 applies to whichever collaborators (e.g., users) or roles with which the edit rule is associated.

Figure 10B:
FIG. 10B illustrates a user interface that may be used to assign collaborators to roles and assign edit rules to roles to individual users according to an embodiment.
Figure 10B:
Figure 10B:
Figure 10B:

Turning to FIG. 10B, an example of a user interface that may be used to assign collaborators to roles and assign edit rules to roles and assign edit rules to individual users will now be described. The user interface 1050 includes a list of groups and a list of users as well as an indication of which editing rule or rules apply to each role or to each user. Thus, for example, to apply Edit Rule 1 to a collaborator, the user locates and selects the collaborator (i.e., the user), then locates and selects the edit rule.

Through interaction with the user interfaces 1000 and 1050, a user can create a new editing rule and specify which column(s) are editable in a given report and specify any data types for which new records can be created (e.g., new people or controls).

Either or both of the user interfaces 1000 and 1050 may include filters or conditions. In one implementation, users or groups have "Viewer" access by default when added to a report, so editing rules should be explicitly applied before anyone can edit data. An individual user's permission to edit data in the database is thus, in effect, an aggregate of all reports plus the editing rules they are assigned. The productivity software 101 creates a "permissions overlay" that reflects this aggregate, and ensures that users can only edit data that is explicitly included their assigned editing rules.

Figure 11:
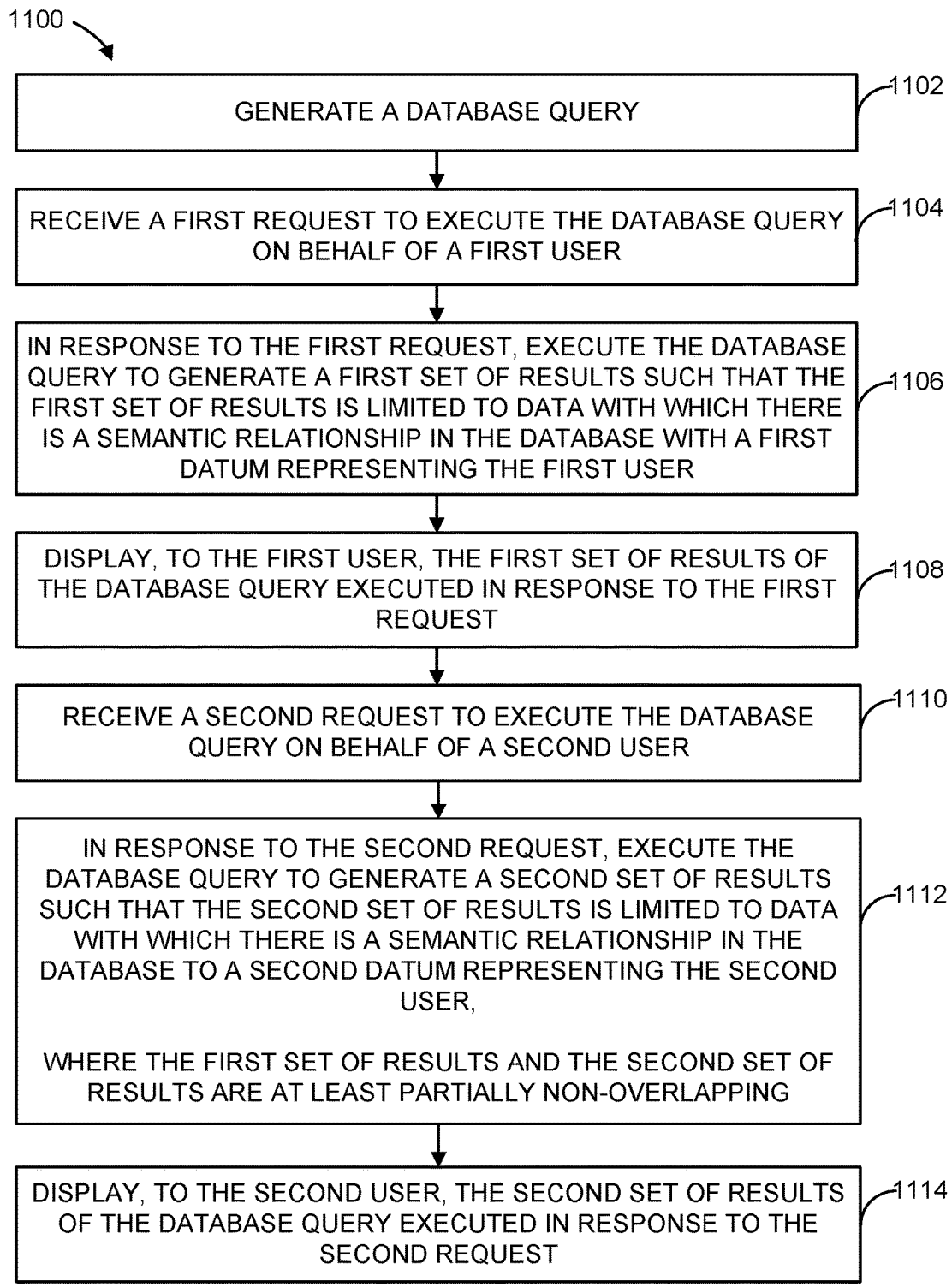
FIG. 11 is a flowchart illustrating an example technique for querying data in a database, according to an embodiment.

FIG. 11 is a flowchart illustrating an example technique for querying data in a database, according to an embodiment. In this embodiment, the process 1100 of FIG. 11 is discussed with reference to the computing devices illustrated in FIGS. 1 and 2. In other embodiments, other suitable computing devices can be used to perform the process illustrated in FIG. 11.

In more detail, the process 1100 is an example technique for executing a user-centric query. In an embodiment, at 1102, a computing device (e.g., a hardware server such as the first computing device 100 or the third computing device 106, or a processor such as the processor 202) is configured to generate a database query. In an embodiment, the computing device is configured to generate the database query in response to a request from a user or a query creator. Once the query is generated, the computing device is configured to store the query in the same database that stores the data, in a separate partition of the database, or in a location that is separate from the database.

At 1104, the computing device is configured to receive a first request to execute the database query on behalf of a first user. In an embodiment, the first request is a request sent by the first user to execute the database query. In another embodiment, the first request is a request generated by the computing device after the first user's log-in credential or identity is authenticated. In still other embodiments, the first request is a request generated by the computing device after certain user information is recognized or verified.

In response to the first request, at 1106, the computing device is configured to execute the database query to generate a first set of results such that the first set of results is limited to data with which there is a semantic relationship in the database to a first datum representing the first user. As used herein, a datum is a piece of data included in a database. Non-limiting examples of a datum include a data vertex or a data node in a graph database, an edge in a graph database, or a field or a record in a relational database. Referring to FIG. 3, each of the PERSON vertices 302, 304, and 306 in the database 300 serves as an example of a datum representing a user. At 1108, the computing device is configured to display, to the first user, the first set of results of the database query executed in response to the first request.

At 1110 of the process 1100, the computing device is configured to receive a second request to execute the database query on behalf of a second user. In an embodiment, the second request is a request sent by the second user to execute the database query. In another embodiment, the second request is a request generated by the computing device after the second user's log-in credential or identity is authenticated. In still other embodiments, the second request is a request generated by the computing device after certain user information is recognized or verified.

Then at 1112, in response to the second request, the computing device is configured to execute the database query to generate a second set of results such that the second set of results is limited to data with which there is a semantic relationship in the database to a second datum representing the second user. As the database query in the process 1100 is a user-centric query, the first set of results (i.e., results of the query executed on behalf of the first user) and the second set of results (i.e., results of the query executed on behalf of the second user) are at least partially non-overlapping. At 1114, the computing device is configured to display, to the second user, the second set of results of the database query executed in response to the second request.

In an embodiment, the database query is generated and executed using a graph database. Accordingly, the computing device is configured to execute the database query such that the first set of results is limited to one or more data nodes in the database that can be reached by traversing from the first datum. The computing device is also configured to execute the database query such that the second set of results is limited to one or more data nodes in the database that can be reached by traversing from the second datum.

In another embodiment, to display the first set of the results to the first user, the computing device is configured to transmit a first report that includes the first set of results to a first computing device for display to the first user. To display the second set of results to the second user, the computing device is configured to transmit a second report that includes the second set of results to a second computing device for display to the second user.

In still another embodiment, the computing device is configured to grant, to the first user a first type of permission (e.g., own) to access the database query. When the database query is executed in response to the first request, the computing device is configured to grant, to the first user, the first type of permission (e.g., own) to access data included in the first set of the results. In other words, the computing device is configured to grant, to the first user, the same type of permission to access the database query and the first set of results.

In yet another embodiment, the computing device is configured to grant, to the second user, a second type of permission (e.g., view or edit) to access the database query. When the database query is executed in response to the second request, the computing device is configured to grant, to the second user, the second type of permission (e.g., view or edit) to access data included in the second set of results. In other words, the computing device is configured to grant, to the second user, the same type of permission to access both the database query and the second set of results.

Figure 12:
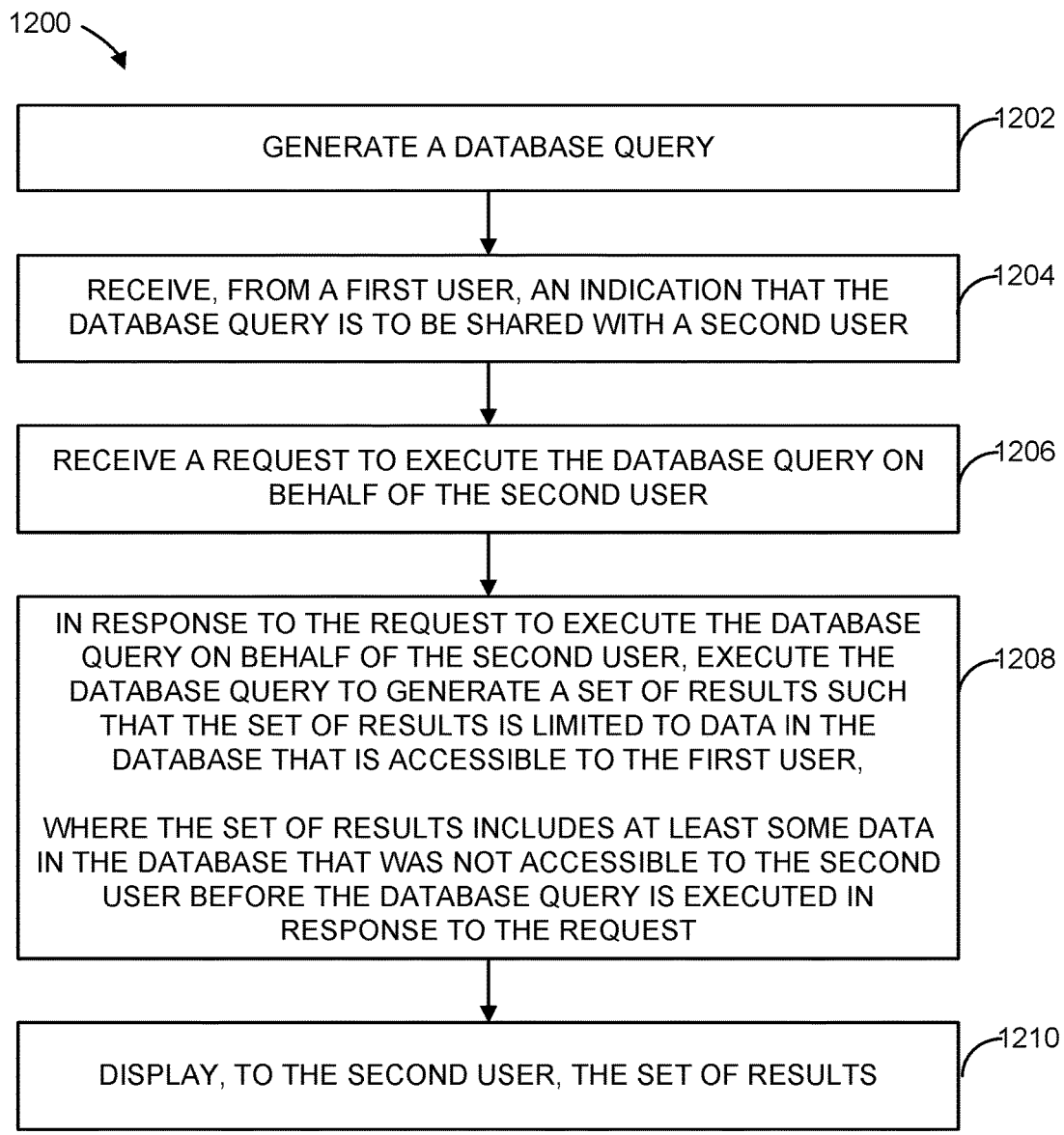
FIG. 12 is a flowchart illustrating another example technique for querying data in a database, according to an embodiment.

FIG. 12 is a flowchart illustrating another example technique for querying data in a database, according to an embodiment. In this embodiment, the process 1200 of FIG. 12 is discussed with reference to the computing devices illustrated in FIGS. 1 and 2. In other embodiments, other suitable computing devices can be used to perform the process illustrated in FIG. 12.

The process 1200 is an example technique that allows a user to execute the query as another user (e.g., the "run-as-query-creator" mode discussed previously). In an embodiment, at 1202, a computing device (e.g., a hardware server such as the first computing device 100 or the third computing device 106, or a processor such as the processor 202) is configured to generate a database query. At 1204, the computing device is configured to receive, from a first user, an indication that the database query is to be shared with a second user. For example, referring to FIG. 5, user1 (represented by the PERSON vertex 302) can share query1 of the QUERY vertex 320 with user2 (represented by the PERSON vertex 304) via the Execute edge 542.

At 1206, the computing device is configured to receive a request to execute the database query on behalf of the second user. In response to the request, the computing device is configured to execute the database query on behalf of the second user to generate a set of results such that the set of results is limited to data in the database that is accessible to the first user. The set of results includes at least some data in the database that was not accessible to the second user before the database query is executed in response to the request. Then at 1210, the computing device is configured to display the set of results to the second user.

In an embodiment, to display the set of results to the second user, the computing device is configured to transmit a report that includes the set of results to a second computing device for display to the second user.

In some embodiments, the set of results is limited to data with which there is a semantic relationship in the database to a first datum representing the first user.

In another embodiment, the computing device is configured to grant, to the first user, a first type of permission (e.g., own) to access the database query. The computing device is then configured to execute the database query on behalf of the first user. After executing the database query on behalf of the first user, the computing device is configured to grant, to the first user, the first type of permission (e.g., own) to access data included in the results of the database query.

In yet another embodiment, after receiving, from the first user, the indication that the database query is to be shared with the second user, the computing device is configured to grant, to the second user, a second type of permission (e.g., view) to access the database query. After executing the database query on behalf of the second user, the computing device is configured to grant, to the second user, the second type of permission (e.g., view) to access data included in the set of results.

In still another embodiment, after receiving, from the first user, the indication that the database query is to be shared with the second user, the computing device is configured to grant, to the second user, a second type of permission (e.g., execute) to access the database query. After executing the database query on behalf of the second user, the computing device is configured to grant, to the second user, permission to execute the database query using data accessible to the first user.

Figure 13:
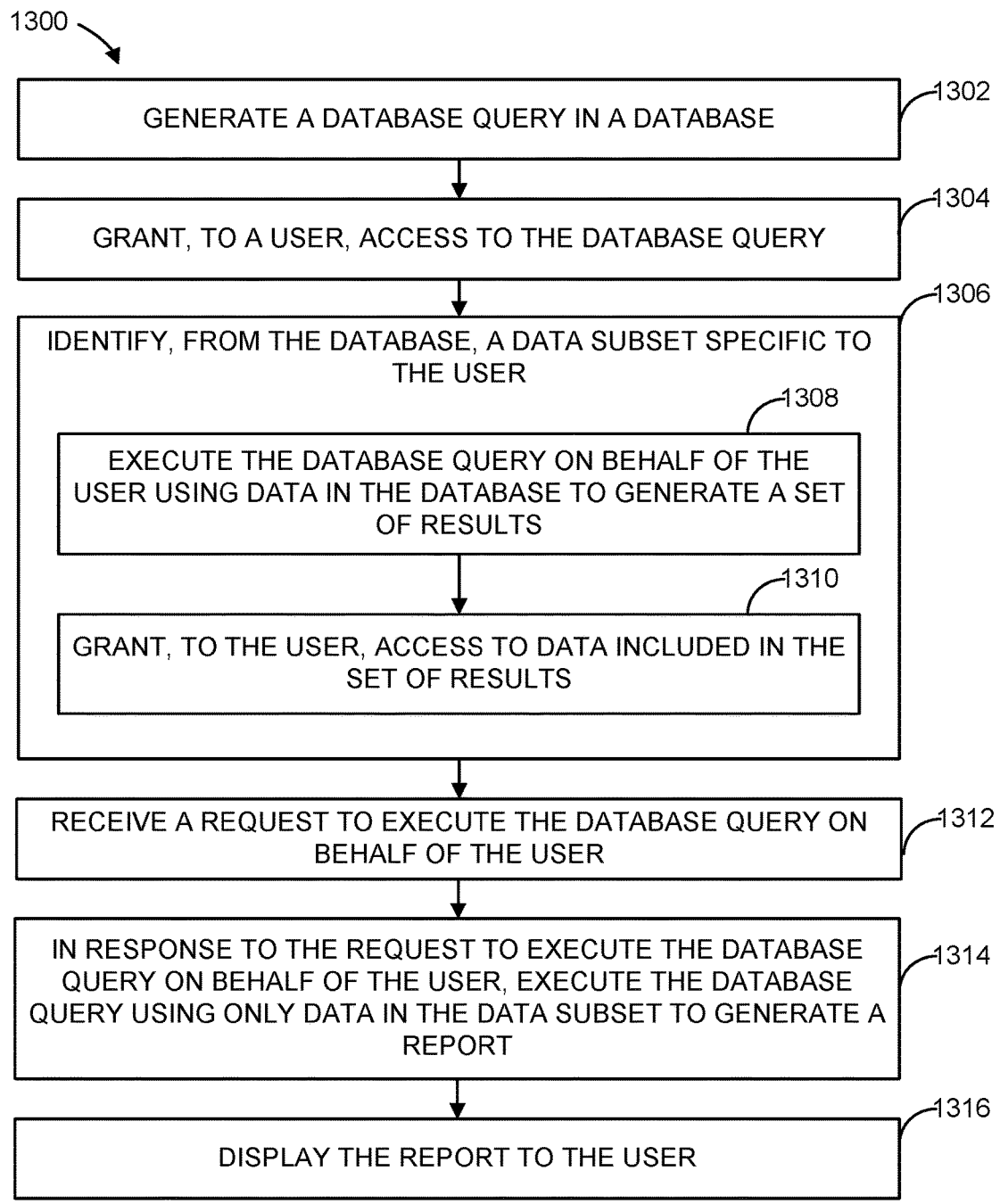
FIG. 13 is a flowchart illustrating yet another example technique for querying data in a database, according to an embodiment.

FIG. 13 is a flowchart illustrating yet another example technique for querying data in a database, according to an embodiment. In this embodiment, the process 1300 of FIG. 13 is discussed with reference to the computing devices illustrated in FIGS. 1 and 2. In other embodiments, other suitable computing devices can be used to perform the process illustrated in FIG. 13.

The process 1300 illustrates an example technique for generating a user-specific data subset (e.g., the user-specific data subset 400 for user2 of FIG. 4). In an embodiment, a computing device (e.g., a hardware server such as the first computing device 100 or the third computing device 106, or a processor such as the processor 202) is configured to generate a database query in a database at 1302. At 1304, the computing device is configured to grant, to the user, access to the database query.

Then at 1306, the computing device is configured to identify, from the database, a data subset specific to the user. To identify the data subset, the computing device is configured to execute the database query on behalf of the user using data in the database to generate a set of results at 1308. Then, at 1310, the computing device is configured to grant, to the user, access to data included in the set of results. At 1312, the computing device is configured to receive a request to execute the database query on behalf of the user. In response to the request to execute the database query on behalf of the user, at 1314, the computing device is configured to execute the database query using only data in the data subset to generate a report. Then at 1316, the computing device is configured to display the report to the user. As discussed previously, the data subset specific to the user allows the user to interact with data that are accessible to the user independent of other users.

In some embodiments, the computing device is configured to identify the data subset by including, in the data subset, the data included in the set of results and the database query. In other embodiments, the computing device is configured to identify the data subset by including, in the data subset, a reference to the data included in the set of results and a reference to the database query. The computing device may further store the data subset in memory.

In an embodiment, when executing the database query using data in the database, the computing device is configured to execute the database query such that the set of results is limited to data with which there is a semantic relationship in the database to a datum representing the user.

In another embodiment, the computing device is configured to grant, to the user, a first type of permission to access to the database query. The computing device is further configured to grant, to the user, the first type of permission to access the data included in the set of results.

In still another embodiment, the computing device is configured to receive a request to modify data. Then, the computing device is configured to update the database to include the modified data. The computing device is further configured to determine whether the request to modify data affects or modifies any data in the data subset. Based on a determination that the request to modify data would modify data in the data subset, the computing device is configured to regenerate the data subset to include the modified data.

In yet another embodiment, the computing device is configured to grant, to a second user, access to the database query. The computing device is then configured to identify, from the database, a second data subset specific to the second user. To identify the second data subset, the computing device is configured to execute the database query, on behalf of the second user, using data in the database to generate a second set of results. The computing device is also configured to grant, to the second user, access to data included in the second set of results. Then, the computing device is configured to receive a request to execute the database query on behalf of the second user. In response to the request to execute the database query on behalf of the second user, the computing device is configured to execute the database query using only data in the second data subset.

In some embodiments, the computing device is configured to identify the second data subset by including, in the second data subset, the data included in the second set of results and the database query. In other embodiments, the computing device is configured to identify the second data subset by including, in the second data subset, a reference to the data included in the second set of results and a reference to the database query. The computing device is configured to store the second data subset in the memory to be separate from the data subset.

In an embodiment, the computing device is configured to receive, from the user, an indication that the database query is to be shared with the second user. Then, the computing device is configured to receive a request to execute the database query on behalf of the second user. In response to the request from the second user, the computing device is configured to execute the database query such that it is limited to data in the data subset specific to the user.

Figure 14:
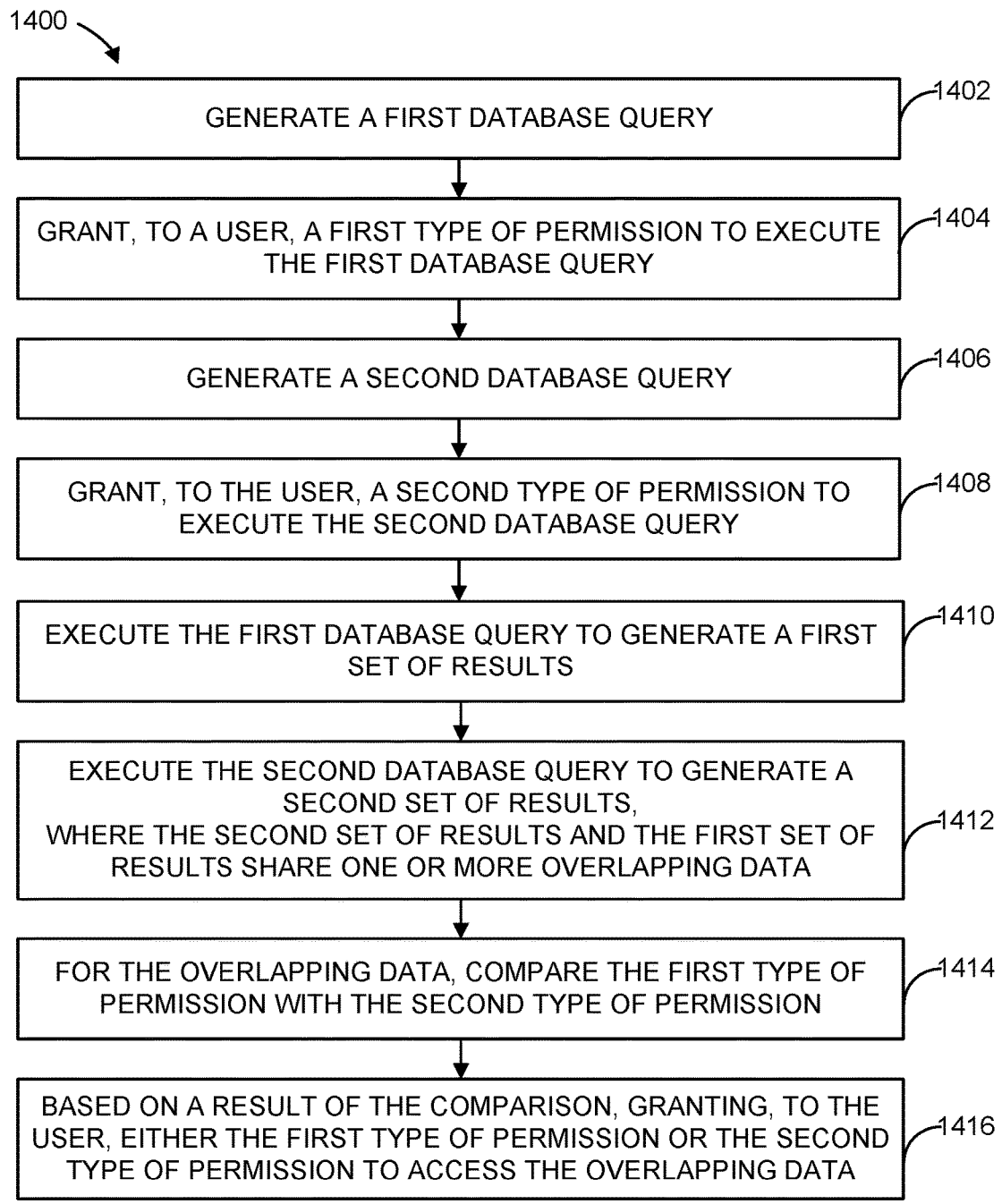
FIG. 14 is a flowchart illustrating still another example technique for querying data in a database, according to an embodiment.

FIG. 14 is a flowchart illustrating another example technique for querying data in a database, according to an embodiment. In this embodiment, the process 1400 of FIG. 14 is discussed with reference to the computing devices illustrated in FIGS. 1 and 2. In other embodiments, other suitable computing devices can be used to perform the process illustrated in FIG. 14.

The process 1400 is an example technique for resolving permission conflicts between queries. At 1402, a computing device (e.g., a hardware server such as the first computing device 100 or the third computing device 106, or a processor such as the processor 202) is configured to generate a first database query. At 1404, the computing device is configured to grant, to a user, a first type of permission to execute the first database query. At 1406, the computing device is configured to generate a second database query. Then at 1408, the computing device is configured to grant, to the user, a second type of permission to execute the second database query.

At 1410, the computing device is configured to execute the first database query to generate a first set of results. Then at 1412, the computing device is configured to execute the second database query to generate a second set of results, where the second set of results and the first set of results share one or more overlapping data. For the overlapping data, the computing device is configured to compare the first type of permission with the second type of permission, at 1414. At 1416, based on a result of the comparison, the computing device is configured to grant, to the user, either the first type of permission or the second type of permission to access the overlapping data.

In various embodiments, the first type of permission is different from the second type of permission. In an embodiment, the first type of permission (e.g., edit) is more permissive than the second type of permission (e.g., view). In another embodiment, the first type of permission is more restrictive (e.g., edit) than the second type of permission (e.g., own).

In an embodiment, the computing device is configured to determine whether the first type of permission is more permissive than the second type of permission. The computing device is configured to grant, to the user, the first type of permission to access the overlapping data if the first type of permission is more permissive. The computing device is further configured to grant, to the user, the second type of permission to access the overlapping data if the second type of permission is more permissive.

In another embodiment, the computing device is configured to determine whether the first type of permission is more restrictive than the second type of permission. If the first type of permission is more restrictive, the computing device is configured to grant, to the user, the first type of permission to access the overlapping data. If the second type of permission is more restrictive, the computing device is configured to grant, to the user, the second type of permission to access the overlapping data.

Furthermore, the computing device is configured to grant, to the user, the first type of permission to access the remaining data in the first set of results. The computing device is also configured to grant, to the user, the second type of permission to access the remaining data in the second set of results.

The computing device is further configured to generate a data subset specific to the user. In an embodiment, the data subset includes the overlapping data, the remaining data in the first set of results, the remaining data in the second set of results, the first database query, the second database query, the first type of permission, and the second type of permission. In another embodiment, the data subset includes a reference to the overlapping data, a reference to the remaining data in the first set of results, a reference to the remaining data in the second set of results, a reference to the first database query, a reference to the second database query, a reference to the first type of permission, and a reference to the second type of permission.

Figure 15:
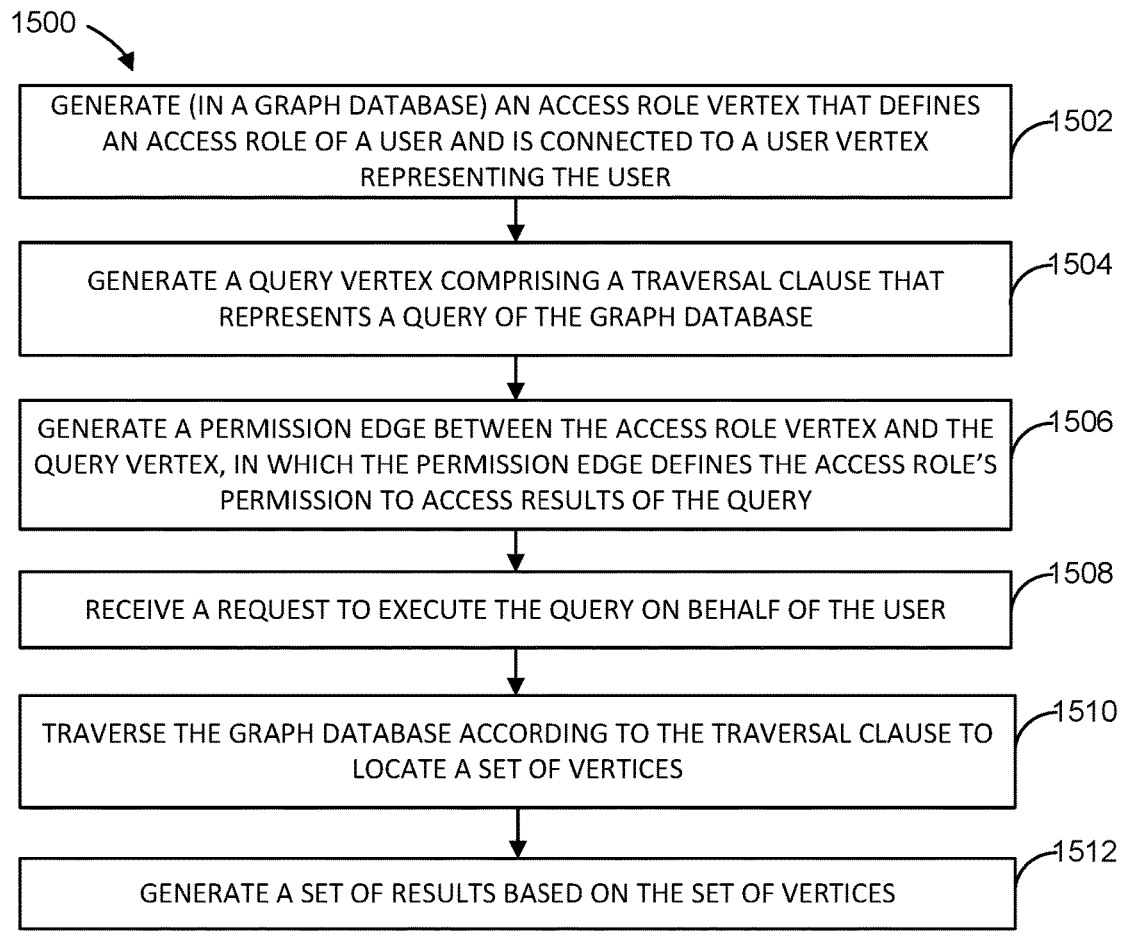
FIG. 15 is a flowchart illustrating an example of how access roles are used in an embodiment.

Turning to FIG. 15, an example (process 1500) of how access roles are used in an embodiment will now be described. At 1502, a computing device (e.g., a hardware server such as the first computing device 100 or the third computing device 106, or a processor such as the processor 202) generates (in a graph database) an access role vertex that defines an access role of a user (or a group of users) and is connected to a user vertex representing the user (or a group vertex representing the group of users). At 1504, the computing device generates a query vertex comprising a traversal clause that represents a query of the graph database. At 1506, the computing device generates a permission edge between the access role vertex and the query vertex, where the permission edge defines the access role's permission to access results of the query. At 1508, the computing device receives a request to execute the query on behalf of the user. At 1510, in response to the computing device traverses the graph database according to the traversal clause to locate a set of vertices . At 1512, the computing device generates a set of results based on the set of vertices.

In another embodiment, the computing device generates an edit rule vertex, where the edit rule vertex includes a rule that defines the access role's permission to access the results of the query, and the permission defined by the rule is different from the permission defined by the permission edge. The computing device further generates an edge between the query vertex and the edit rule vertex, and generates an edge between the access role vertex and the edit rule vertex.

In an embodiment, the permission defined by the rule overrides the permission defined by the permission edge. In some embodiments, the permission defined by the rule is more permissive than the permission defined by the permission edge.

In various embodiments, the traversal clause identifies a data vertex, and the computing device traverses the graph database to locate the set of vertices by starting from the data vertex. In an embodiment, the data vertex is the user vertex, and the computing device traverses the graph database by starting from the user vertex. In another embodiment, the data vertex is the access role vertex, and the computing device traverses the graph database by starting from the access role vertex.

In various embodiments, the computing device displays, to the user, set of results based on the located set of vertices.

Figure 16:
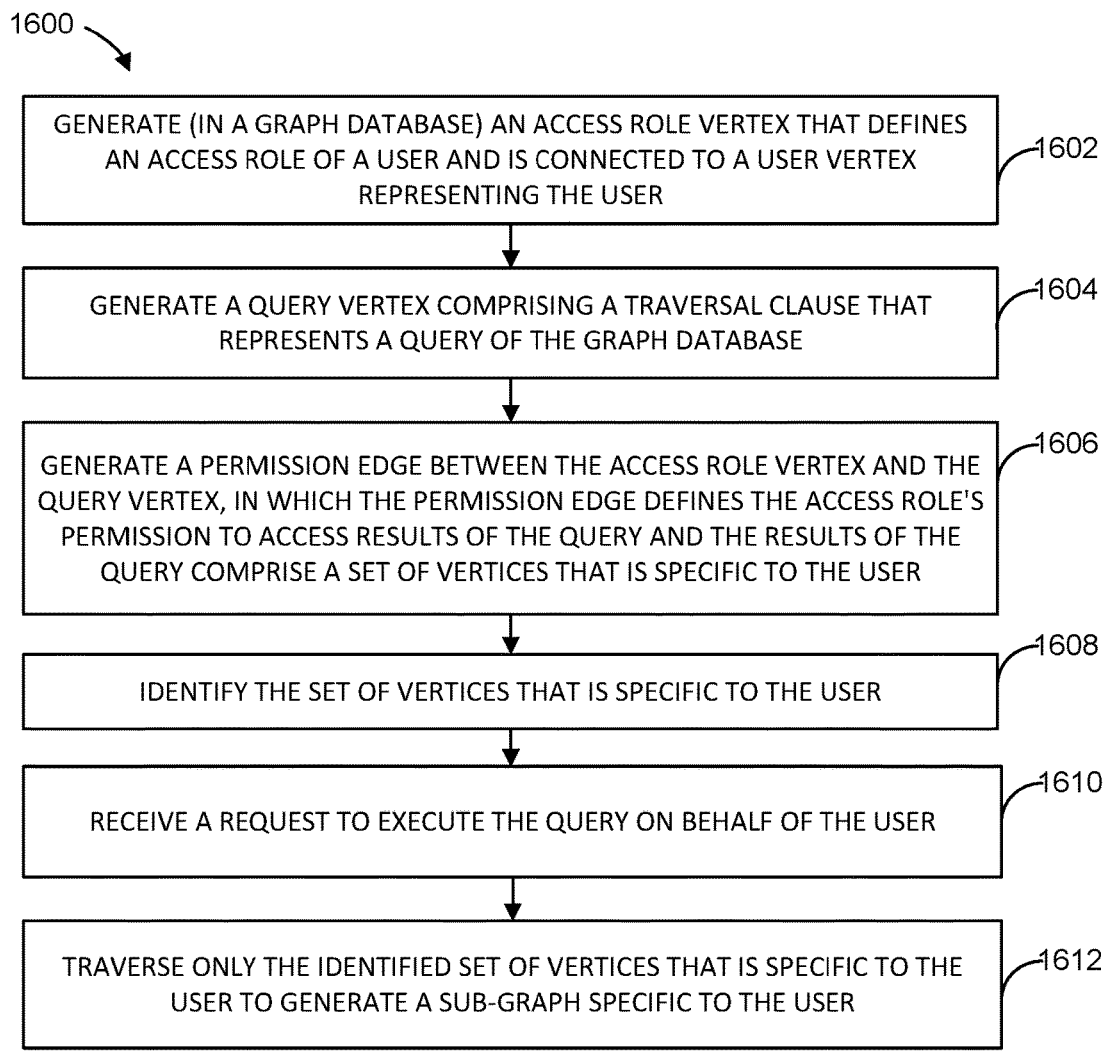
FIG. 16 is a flowchart illustrating an example of how access roles are used in another embodiment.

Turning to FIG. 16, another example (process 1600) of how access roles are used in an embodiment will now be described. At 1602, the computing device generates (in a graph database) an access role vertex that defines and access role of a user (or a group of users) and is connected to a user vertex representing the user (or a group vertex representing the group of users). At 1604, the computing device generates a query vertex comprising a traversal clause that represents a query of the graph database. At 1606, the computing device generates a permission edge between the access role vertex and the query vertex, where the permission edge defines the access role's permission to access results of the query, and the results of the query includes a set of vertices that is specific to the user. At 1608, the computing device identifies from the graph database the set of vertices that is specific to the user. At 1610, the computing device receives a request to execute the query on behalf of the user. At 1612, in response to the request, the computing device traverses only the identified set of vertices that is specific to the user to generate a sub-graph specific to the user.

In an embodiment, the computing device generates a report using data in the sub-graph, and displays the report to the user.

In various embodiments, the sub-graph includes the set of vertices that is specific to the user and the query. In other embodiments, the sub-graph includes a reference to the set of vertices that is specific to the user and a reference to the query.

In another embodiment, the computing device receives a request to modify data. The computing device updates the graph database to include the modified data, and determines whether the request to modify data modifies data in the identified set of vertices. Based on a determination that the request to modify data modifies data in the identified set of vertices, the computing device regenerates the sub-graph to include the modified data.

Figure 17:
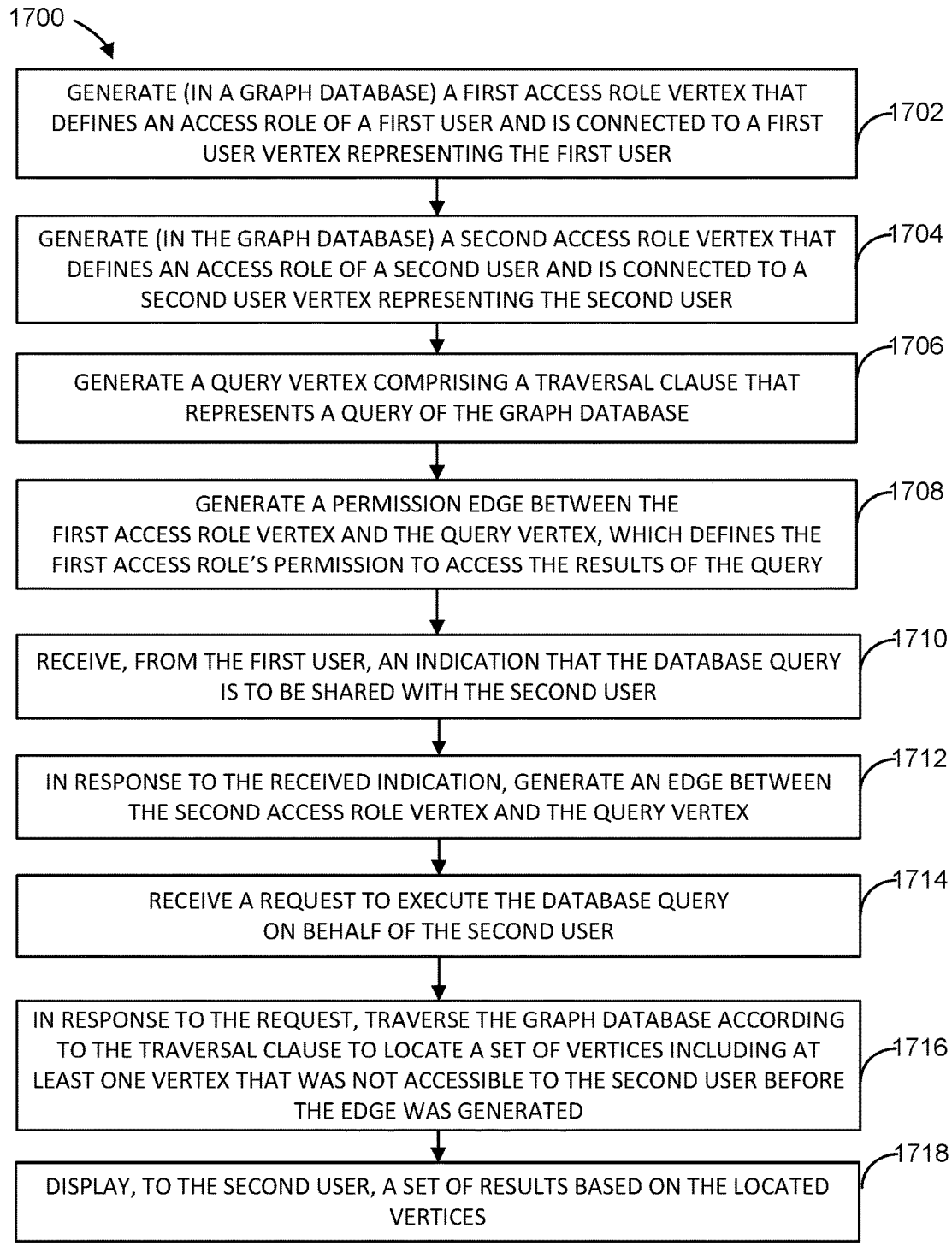
FIG. 17 is a flowchart illustrating an example of how access roles are used in still another embodiment.

Turning to FIG. 17, still another example (process 1700) of how access roles are used in an embodiment will now be described. At 1702, the computing device generates (in a graph database) a first access role vertex that defines an access role of a first user and is connected to a first user vertex representing the first user. At 1704, the computing device generates (in the graph database) a second access role vertex that defines an access role of a second user and is connected to a second user vertex representing the second user. At 1706, the computing device generates a query vertex comprising a traversal clause that represents a query of the graph database. At 1708, the computing device generates a permission edge between the first access role vertex and the query vertex, in which the permission edge defines the first access role's permission to the access the results of the query. At 1710, the computing device receives, from the first user, an indication that the database query is to be shared with the second user. At 1712, in response to the received indication, the computing device generates an edge between the second access role vertex and the query vertex. At 1714, the computing device receives a request to execute the database query on behalf of the second user. At 1716, in response to the request, the computing device traverses the graph database according to the traversal clause to locate a set of vertices, and the set of vertices includes at least one vertex that was not accessible to the second user before the edge was generated between the second access role vertex and the query vertex. At 1718, the computing device displays, to the second user, a set of results based on the located vertices.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises", "comprising", "includes", "including", "has", and "having", as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first", "second", etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A method implemented on a computing device, the method comprising:
    generating, in a graph database, an access role vertex that defines an access role of a user, wherein the access role vertex is connected to a user vertex representing the user;
    generating a query vertex comprising a traversal clause that represents a query of the graph database;
    generating a permission edge between the access role vertex and the query vertex, wherein the permission edge defines the access role's default permission to access results of the query;
    generating an edit rule vertex, wherein the edit rule vertex comprises a rule that defines a permission to edit the results of the query;
    generating an edge between the query vertex and the edit rule vertex;
    generating an edge between the access role vertex and the edit rule vertex, wherein the permission to edit the results of the query defined by the rule overrides the default permission defined by the permission edge;
    receiving a request to execute the query on behalf of the user;
    in response to the request, traversing the graph database according to the traversal clause to locate a set of vertices; and
    generating a set of results based on the set of vertices.

2. The method of claim 1, wherein the permission defined by the rule is more permissive than the default permission defined by the permission edge.

3. The method of claim 1, wherein the traversal clause identifies a data vertex, and traversing the graph database according to the traversal clause comprises traversing the graph database starting from the data vertex.

4. The method of claim 3, wherein the data vertex identified in the traversal clause is the user vertex.

5. The method of claim 3, wherein the data vertex identified in the traversal clause is the access role vertex.

6. The method of claim 1, further comprising displaying, to the user, the set of results.

7. The method of claim 1, wherein the default permission defined by the permission edge is view permission.

8. A method implemented on a computing device, the method comprising:
    generating, in a graph database, an access role vertex that defines an access role of a user, wherein the access role vertex is connected to a user vertex representing the user;
    generating a query vertex comprising a traversal clause that represents a query of the graph database;
    generating a permission edge between the access role vertex and the query vertex, wherein the permission edge defines the access role's default permission to access results of the query, wherein the results of the query comprise a set of vertices that is specific to the user;
    generating an edit rule vertex, wherein the edit rule vertex comprises a rule that defines a permission to edit the results of the query;
    generating an edge between the query vertex and the edit rule vertex;

generating an edge between the access role vertex and the edit rule vertex, wherein the permission to edit the results of the query defined by the rule overrides the default permission defined by the permission edge;
identifying, from the graph database, the set of vertices that is specific to the user;
receiving a request to execute the query on behalf of the user; and
in response to the request, traversing only the identified set of vertices that is specific to the user to generate a sub-graph specific to the user.

9. The method of claim 8, wherein the permission defined by the rule is more permissive than the default permission defined by the permission edge.

10. The method of claim 8, wherein the traversal clause identifies a data vertex, and identifying the set of vertices that is specific to the user comprises traversing the graph database starting from the data vertex.

11. The method of claim 10, wherein the data vertex identified in the traversal clause is the user vertex.

12. The method of claim 10, wherein the data vertex identified in the traversal clause is the access role vertex.

13. The method of claim 8, further comprising:
generating a report using data in the sub-graph; and
displaying the report to the user.

14. The method of claim 8, wherein the sub-graph comprises the set of vertices that is specific to the user and the query vertex.

15. The method of claim 8, wherein the sub-graph comprises a reference to the set of vertices that is specific to the user and a reference to the query vertex.

16. The method of claim 8, further comprising:
receiving a request to modify data;
updating the graph database to include the modified data;
determining whether the request to modify data modifies data in the identified set of vertices; and
based on a determination that the request to modify data modifies data in the identified set of vertices, regenerating the sub-graph to include the modified data.

17. The method of claim 8, wherein the default permission defined by the permission edge is view permission.

18. A method implemented on a computing device, the method comprising:
generating, in a graph database, a first access role vertex that defines an access role of a first user, wherein the first access role vertex is connected to a first user vertex representing the first user;
generating, in the graph database, a second access role vertex that defines an access role of a second user, wherein the second access role vertex is connected to a second user vertex representing the second user;
generating a query vertex comprising a traversal clause that represents a query of the graph database;
generating a permission edge between the first access role vertex and the query vertex, wherein the permission edge defines the first access role's default permission to access the results of the query;
generating an edit rule vertex, wherein the edit rule vertex comprises a rule that defines a permission to edit the results of the query;
generating an edge between the query vertex and the edit rule vertex;
generating an edge between the first access role vertex and the edit rule vertex, wherein the permission to edit the results of the query defined by the rule overrides the default permission defined by the permission edge;
receiving, from the first user, an indication that the database query is to be shared with the second user;
in response to the received indication, generating an edge between the second access role vertex and the query vertex;
receiving a request to execute the database query on behalf of the second user;
in response to the request, traversing the graph database according to the traversal clause to locate a set of vertices, wherein the set of vertices includes at least one vertex in the graph database that was not accessible to the second user before the edge was generated between the second access role vertex and the query vertex; and
displaying, to the second user, a set of results based on the located set of vertices.

19. The method of claim 18, wherein the default permission defined by the rule is more permissive than the default permission defined by the permission edge.

20. The method of claim 18, wherein the traversal clause identifies a data vertex, and traversing the graph database according to the traversal clause comprises traversing the graph database starting from the data vertex.

21. The method of claim 20, wherein the data vertex identified in the traversal clause is the user vertex.

22. The method of claim 20, wherein the data vertex identified in the traversal clause is the access role vertex. defined by the permission edge is view permission.

23. The method of claim 18, wherein the default permission defined by the permission edge is view permission.

* * * * *